US012328568B2

(12) United States Patent
Eronen et al.

(10) Patent No.: US 12,328,568 B2
(45) Date of Patent: Jun. 10, 2025

(54) RENDERING REVERBERATION

(71) Applicant: Nokia Technologies Oy, Espoo (FI)

(72) Inventors: Antti Eronen, Tampere (FI); Tapani Pihlajakuja, Kellokoski (FI); Archontis Politis, Tampere (FI); Otto Puomio, Helsinki (FI); Tapio Lokki, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 150 days.

(21) Appl. No.: 17/908,129

(22) PCT Filed: Mar. 5, 2021

(86) PCT No.: PCT/FI2021/050160
§ 371 (c)(1),
(2) Date: Aug. 30, 2022

(87) PCT Pub. No.: WO2021/186102
PCT Pub. Date: Sep. 23, 2021

(65) Prior Publication Data
US 2023/0100071 A1 Mar. 30, 2023

(30) Foreign Application Priority Data
Mar. 16, 2020 (GB) ...................................... 2003798

(51) Int. Cl.
*H04S 7/00* (2006.01)

(52) U.S. Cl.
CPC .............. *H04S 7/305* (2013.01); *H04S 7/307* (2013.01); *H04S 2400/11* (2013.01); *H04S 2400/15* (2013.01)

(58) Field of Classification Search
CPC ...... H04S 7/305; H04S 7/307; H04S 2400/11; H04S 2400/15; H04S 2420/11; H04S 2420/13
(Continued)

(56) References Cited

U.S. PATENT DOCUMENTS 8,751,029 B2 6/2014 Soulodre
9,510,125 B2 11/2016 Raghuvanshi et al.
(Continued)

FOREIGN PATENT DOCUMENTS

CN 108391199 A 8/2018
EP 3048817 A1 7/2016
(Continued)

OTHER PUBLICATIONS

Melchior, Design and Implementation of an Interactive Room Simulation for Wave Field Synthesis (Year: 2010).*
(Continued)

*Primary Examiner* — William A Jerez Lora
(74) *Attorney, Agent, or Firm* — McCarter & English, LLP

(57) ABSTRACT

An apparatus comprising means configured to: obtain at least one impulse response; obtain at least one reflection filter based on the obtained at least one impulse response, wherein the at least one reflection filter is configured to determine at least one early reflection from an acoustic surface which is not overlapped in time by any other reflection, wherein a duration of the at least one early reflection is shorter than a duration of the obtained at least one impulse response. In addition, an apparatus comprising means configured to: obtain at least one impulse response, wherein the at least one impulse response is configured with a perceivable timbre during rendering; create a timbral modification filter; obtain at least one audio signal; and render at least one output audio signal based on the at least one audio signal, wherein the at least one output signal is based on an application of the timbral modification filter.

20 Claims, 29 Drawing Sheets

(58) Field of Classification Search
USPC .................................................. 381/1, 2, 303
See application file for complete search history.

(56) References Cited

U.S. PATENT DOCUMENTS

| | | | | |
|---|---|---|---|---|
| 9,961,473 | B2 | 5/2018 | Schlecht et al. | |
| 10,248,744 | B2 | 4/2019 | Schissler et al. | |
| 2006/0053018 | A1 | 3/2006 | Engdegard et al. | |
| 2008/0273708 | A1 | 11/2008 | Sandgren et al. | |
| 2011/0135098 | A1 | 6/2011 | Kuhr et al. | 381/17 |
| 2016/0212554 | A1 | 7/2016 | Chafe | |
| 2016/0241986 | A1 | 8/2016 | Lang et al. | |
| 2017/0180907 | A1* | 6/2017 | Kuhr | H04S 3/004 |
| 2017/0223478 | A1 | 8/2017 | Jot et al. | |
| 2017/0238119 | A1* | 8/2017 | Schlecht | H04S 3/02 381/303 |
| 2018/0232471 | A1 | 8/2018 | Schissler et al. | |
| 2018/0242094 | A1 | 8/2018 | Baek et al. | |
| 2019/0052989 | A1 | 2/2019 | Fielder et al. | |
| 2019/0124461 | A1 | 4/2019 | Christoph | |
| 2019/0147894 | A1 | 5/2019 | Lee et al. | |
| 2019/0387352 | A1 | 12/2019 | Jot et al. | |

FOREIGN PATENT DOCUMENTS

| | | | |
|---|---|---|---|
| EP | 3 550 859 | A1 | 10/2019 |
| EP | 3595337 | A1 | 1/2020 |
| GB | 2544458 | A | 5/2017 |
| JP | 2003061200 | A | 2/2003 |
| JP | 2009-105565 | A | 5/2009 |
| JP | 2015-055782 | A | 3/2015 |
| JP | 2015-219413 | A | 12/2015 |
| JP | 2016100877 | A | 5/2016 |
| WO | 99/21164 | A1 | 4/1999 |
| WO | 2009/111798 | A1 | 9/2009 |
| WO | 2015/103024 | A1 | 7/2015 |
| WO | 2018/234619 | A2 | 12/2018 |
| WO | 2019/110870 | A1 | 6/2019 |
| WO | 2019/197709 | A1 | 10/2019 |

OTHER PUBLICATIONS

Office Action received for corresponding Indian Patent Application No. 202247057914, dated Dec. 28, 2022, 10 pages.

"MPEG-I Audio Architecture and Requirements", Audio subgroup, ISO/IEC JTC1/SC29/WG11, MPEG2019/N18158, Jan. 2019, pp. 1-6.

Coleman et al., "Object-Based Reverberation for Spatial Audio", Journal of the Audio Engineering Society, vol. 65, No. 1/2, Jan./Feb. 2017, pp. 66-77.

Vaananen et al., "Advanced AudioBIFS: virtual acoustics modeling in MPEG-4 scene description", IEEE Transactions on Multimedia, vol. 6, No. 5, Oct. 2004, pp. 661-675.

Merimaa et al., "Spatial Impulse Response Rendering I: Analysis and Synthesis", Journal of the Audio Engineering Society, vol. 53, No. 12, Dec. 2005, pp. 1115-1127.

Valimaki et al., "Fifty years of artificial reverberation", IEEE Transactions on Audio, Speech, and Language Processing, vol. 20, No. 5, Jul. 2012, pp. 1421-1448.

Valimaki et al., "More than 50 years of artificial reverberation", Journal of the Audio Engineering Society, 60th Int. Conf. DREAMS (Dereverberation and Reverberation of Audio, Music, and Speech), 2016, pp. 1-21.

Valimaki et al.,"Late reverberation synthesis using filtered velvet noise", Applied Sciences, vol. 7, No. 5, 2017, pp. 1-17.

Savioja et al., "Creating interactive virtual acoustic environments", Journal of the Audio Engineering Society, vol. 47, No. 9, Sep. 1999, pp. 675-705.

"Evertims", Evertims.Github, Retrieved on Aug. 30, 2022, Webpage available at : https://evertims.github.io/.

Anderson et al., "Modeling the Proportion of Early and Late Energy in Two-Stage Reverberators", Journal of the Audio Engineering Society, vol. 65, No. 12, Dec. 2017, pp. 1017-1031.

Tervo et al., "Spatial Decomposition Method for Room Impulse Responses", Journal of the Audio Engineering Society, vol. 61, No. 1/2, Jan./Feb. 2013, pp. 17-28.

Menzer et al., "Binaural reverberation using a modified Jot reverberator with frequency-dependent interaural coherence matching", 126th Convention of the Audio Engineering Society, Munich, May 7-10, 2009, pp. 1-6.

Alary et al., "Directional Feedback Delay Network", Journal of the Audio Engineering Society, vol. 67, No. 10, Oct. 2019, pp. 752-762.

Karjalainen et al., "More about this reverberation science: Perceptually good late reverberation", Audio Engineering Society, Convention Paper 5415, 111th Convention, Sep. 21-24, 2001, pp. 1-8.

Schröder, "Physically Based Real-Time Auralization of Interactive Virtual Environments", Dissertation, 2011, 231 pages.

Noisternig et al., "Framework for Real-Time Auralization in Architectural Acoustics", Acta Acustica united with Acusticam, vol. 94, 2008, pp. 1000-1015.

Hamilton et al., "FDTD Methods for 3-D Room Acoustics Simulation With High-Order Accuracy in Space and Time", IEEE/ACM Transactions on Audio, Speech, and Language Processing, vol. 25, No. 11, Nov. 2017, pp. 2112-2124.

"Conversion to Minimum Phase", Center for Computer Research in Music and Acoustics (CCRMA), Retrieved on Aug. 30, 2022, Webpage available at : https://ccrma.stanford.edu/~jos/filters/Conversion_Minimum_Phase.html.

Härmä et al., "Frequency-Warped Signal Processing for Audio Applications", Journal of the Audio Engineering Society, vol. 48, No. 11, Nov. 2000, pp. 1011-1029.

Politis et al., "Parametric Spatial Audio Effects", Proceedings of the 15th International Conference on Digital Audio Effects (DAFx12), Sep. 17-21, 2012, pp. DAFX-1-DAFX-8.

Jot et al., "Augmented Reality Headphone Environment Rendering", Audio Engineering Society, Audio for Virtual and Augmented Reality, Sep. 30-Oct. 1, 2016, pp. 1-6.

Li et al., "Scene-Aware Audio for 360° Videos", arXiv, May 12, 2018, pp. 111:1-111:12.

Michael et al., "Virtual Scene Adaption for Compensation of the Reproduction Room", Inter-Noise and Noise-Con Congress and Conference Proceedings, 2019, 10 pages.

Pelzer et al., "Inversion of a Room Acoustics Model for the Determination of Acoustical Surface Properties in Enclosed Spaces", Proceedings of Meetings on Acoustics, vol. 19, No. 1, 2013, pp. 1-9.

Sheaffer et al., "Rendering Binaural Room Impulse Responses from Spherical Microphone Array Recordings Using Timbre Correction", EAA Joint Symposium on Auralization and Ambisonics, Apr. 3-5, 2014, pp. 81-85.

Search Report received for corresponding United Kingdom Patent Application No. 2003798.2, dated Sep. 15, 2020, 6 pages.

Invitation to Pay Additional Fees received for corresponding Patent Cooperation Treaty Application No. PCT/FI2021/050160, dated Jun. 1, 2021, 6 pages.

Melchior et al., "Design and Implementation of an Interactive Room Simulation for Wave Field Synthesis", 40th International Conference: Spatial Audio: Sense the Sound of Space, Oct. 8, 2010, pp. 392-399.

Melchior, "Investigations on spatial sound design based on measured room impulse responses", Thesis, 2011, 306 pages.

Huopaniemi et al., "Modeling of reflections and air absorption in acoustical spaces a digital filter design approach", Proceedings of 1997 Workshop on Applications of Signal Processing to Audio and Acoustics, Oct. 19-22, 1997, 4 pages.

International Search Report and Written Opinion received for corresponding Patent Cooperation Treaty Application No. PCT/FI2021/050160, dated Jul. 5, 2021, 23 pages.

* cited by examiner

RENDERING REVERBERATION

RELATED APPLICATION

This application claims priority to PCT Application No. PCT/FI2021/050160, filed on Mar. 5, 2021, which claims priority to GB Application No. 2003798.2, filed on Mar. 16, 2020, each of which is incorporated herein by reference in its entirety.

FIELD

The present application relates to apparatus and methods for spatial audio rendering of reverberation, but not exclusively for spatial audio rendering of reverberation in augmented reality and/or virtual reality apparatus.

BACKGROUND

Immersive audio codecs are being implemented supporting a multitude of operating points ranging from a low bit rate operation to transparency. One example of which is MPEG-I (MPEG Immersive audio). Developments of these codecs involve developing apparatus and methods for parameterizing and rendering audio scenes comprising audio elements such as objects, channels, parametric spatial audio and higher-order ambisonics (HOA), and audio scene information containing geometry, dimensions, acoustic materials, and object properties such as directivity and spatial extent. In addition, there can be various metadata which enable conveying the artistic intent, that is, how the rendering should be controlled and/or modified as the user moves in the scene.

MPEG-I Immersive Audio standard (MPEG-I Audio Phase 2 6DoF) will support audio rendering for virtual reality (VR) and augmented reality (AR) applications. The standard will be based on MPEG-H 3D Audio, which supports three degrees of freedom (3DoF) based rendering of object, channel, and HOA content. In 3DoF rendering, the listener is able to listen to the audio scene at a single location while rotating their head in three dimensions (yaw, pitch, roll) and the rendering stays consistent to the user head rotation. That is, the audio scene does not rotate along with the user head but stays fixed as the user rotates their head.

The additional degrees of freedom in six degrees of freedom (6DoF) audio rendering enable the listener to move in the audio scene along the three cartesian dimensions x, y, and z. The MPEG-I standard currently being developed aims to enable this by using MPEG-H 3D Audio as the audio signal transport format while defining new metadata and rendering technology to facilitate 6DoF rendering.

A central topic in MPEG-I is modelling and rendering of reverberation in virtual acoustic scenes. For the predecessor MPEG-H 3D this was not necessary as the listener was not able to move in the space. In such circumstances fixed binaural room impulse response (BRIR) filters were thus sufficient for rendering perceptually plausible, non-parametric reverberation for a single listening position. However, in MPEG-I the listener will have the ability to move in a virtual space, and the way how individual reflections and reverberation change in different parts of the space is likely to be a key aspect in generating a high quality immersive listening experience. Moreover, content creators may require methods for parameterizing the reverberation parameters of an arbitrary virtual space in a perceptually plausible way so that they can create virtual audio experiences according to their artistic preferences.

Reverberation refers to the persistence of sound in a space after the actual sound source has stopped. Different spaces are characterized by different reverberation characteristics. For conveying spatial impression of an environment, reproducing reverberation perceptually accurately is important. This is because listening to natural audio scenes in everyday environment is not only about sounds at particular directions. Even without background ambience, it is typical that the majority of the sound energy arriving to the ears is not from direct sounds but indirect sounds from the acoustic environment (i.e., reflections and reverberation). Based on the room effect, involving discrete reflections and reverberation, the listener auditorily perceives the source distance and room characteristics (small, big, damp, reverberant) among other features, and the room adds to the perceived feel of the audio content. In other words, the acoustic environment is an essential and perceptually relevant feature of spatial sound.

SUMMARY

There is provided according to a first aspect an apparatus comprising means configured to: obtain at least one impulse response; obtain at least one reflection filter based on the obtained at least one impulse response, wherein the at least one reflection filter is configured to determine at least one early reflection from an acoustic surface which is not overlapped in time by any other reflection, wherein a duration of the at least one early reflection is shorter than a duration of the obtained at least one impulse response.

The means configured to obtain at least one impulse response may be configured to obtain a spatial room impulse response, the spatial room impulse response comprising the at least one individual reflection.

The means configured to obtain at least one reflection filter based on the obtained at least one impulse response may be configured to: determine direction of arrival information based on an analysis of the spatial room impulse response; determine a sound pressure level information based on the spatial room impulse response; and determine at least one early reflection which is not overlapped in time by any other reflection based on the direction of arrival information and the sound pressure level information.

The means configured to determine at least one early reflection based on the direction of arrival information and the sound pressure level information may be further configured to determine a time period associated with the determined at least one early reflection which is not overlapped in time by any other reflection.

The means configured to obtain at least one reflection filter based on the obtained at least one impulse response may be configured to extract a portion of the impulse response defined by the time period associated with the determined at least one early reflection which is not overlapped in time by any other reflection.

The means may be further configured to associate the at least one reflection filter with a parameter associated with the early reflection.

The parameter associated with the early reflection may comprise at least one of: a material; a material specification; and a material geometry from which the at least one early reflection which is not overlapped in time by any other reflection occurred.

The parameter associated with the early reflection may be enabled based on at least one of: at least one user input configured to select or define the parameter; virtual acoustic scene geometry and acoustic description of the material in the virtual acoustic scene geometry; and at least one visual recognition of the parameter when the parameter comprises the material, in order to associate the at least one individual reflection filter with the material.

The means configured to obtain at least one reflection filter based on the obtained at least one impulse response may be configured to: obtain octave-band absorption coefficients of a visually recognized material; compare an octave-band magnitude spectrum of the at least one reflection filter to the octave-band absorption coefficients of the visually recognized material; and select the at least one reflection filter which has the octave-band magnitude spectrum closest to the octave-band absorption coefficients of the visually recognized material.

The means may be further configured to generate a database of the at least one reflection filter.

The means may be further configured to store the database of the at least one reflection filter with the associated parameter associated with the early reflection.

According to a second aspect there is provided an apparatus comprising means configured to: obtain at least one audio signal; obtain at least one metadata associated with the at least one audio signal; obtain at least one parameter associated with room acoustics and comprises at least one of a geometry, a dimension and a material; obtain at least one reflection filter in accordance with the at least one parameter, wherein the at least one reflection filter is configured to determine at least one early reflection from at least one impulse response, which is not overlapped in time by any other reflection, wherein a duration of the at least one early reflection is shorter than a duration of the at least one impulse response; and synthesize an output audio signal based on the at least one audio signal, the at least one metadata, the at least one parameter and the at least one reflection filter.

The means configured to synthesize an output audio signal based on the at least one audio signal, the at least one metadata, the at least one parameter and the at least one reflection filter may be configured to select the at least one reflection filter from a database of reflection filters based on the at least one parameter associated with room acoustics.

The at least one parameter associated with room acoustics may be a material parameter.

The means configured to obtain at least one reflection filter in accordance with the at least one parameter may be configured to perform one of: obtain the at least one reflection filter for each material; and obtain a database of at least one reflection filter for each material and furthermore obtain an indicator configured to identify the at least one reflection filter from the database.

According to a third aspect there is provided an apparatus comprising means configured to: obtain at least one impulse response, wherein the at least one impulse response is configured with a perceivable timbre during rendering; create a timbral modification filter; obtain at least one audio signal; render at least one output audio signal based on the at least one audio signal, wherein the at least one output signal is based on an application of the timbral modification filter.

The at least one impulse response is a room impulse response and the means may be further configured to: obtain at least one reference room impulse response, wherein the at least one reference room impulse is configured with a perceivable reference timbre; and modify a magnitude spectrum of the at least one room impulse response based on a frequency response of the at least one reference room impulse response while maintaining a defined directional spatial perception so to apply a timbral modification.

The means configured to modify a magnitude spectrum of the at least one room impulse response based on a frequency response of the at least one reference room impulse response while maintaining a defined directional spatial perception may be configured to: apply the timbral modification filter to the at least one room impulse response, wherein the timbral modification filter is configured to modify a magnitude spectrum of the at least one room impulse response to be closer to a magnitude spectrum of the reference room impulse response while preserving a time structure of at least one early reflections.

The means may be further configured to: apply the timbral modification filter to the at least one audio signal; obtain at least one metadata associated with the at least one audio signal, wherein the means configured to render at least one output audio signal based on at least one audio signal is configured to synthesize a reflection audio signal based on the timbral modified at least one audio signal.

The means may be further configured to separate the at least one audio signal into an early part audio signal and a late part audio signal, wherein the means configured to apply the timbral modification filter to the at least one audio signal may be configured to apply the timbral modification filter to the early part of the at least one audio signal and the late part of the at least one audio signal separately, and wherein the means configured to render at least one output audio signal based on the at least one audio signal may be configured to: render the timbral modified early part of the at least one audio signal and the timbral modified late part of the at least one audio signal separately; and combine the separately rendered timbral modified early part of the at least one audio signal and the timbral modified late part of the at least one audio signal to generate the at least one output audio signal.

The means configured to obtain at least one reference room impulse response, wherein the at least one reference room impulse is configured with a perceivable reference timbre may be configured to perform one of: obtain a spatial or non-spatial room impulse response of a physical acoustic space with desired qualities; obtain an acoustic simulation of a virtual space; perform acoustic measurement or simulation of a listener's physical reproduction space; and obtain a monophonic impulse response of a high-quality reverberation audio effect.

According to a fourth aspect there is provided a method comprising: obtaining at least one impulse response; obtaining at least one reflection filter based on the obtained at least one impulse response, wherein the at least one reflection filter is configured to determine at least one early reflection from an acoustic surface which is not overlapped in time by any other reflection, wherein a duration of the at least one early reflection is shorter than a duration of the obtained at least one impulse response.

Obtaining at least one impulse response may comprise obtaining a spatial room impulse response, the spatial room impulse response comprising the at least one individual reflection.

Obtaining at least one reflection filter based on the obtained at least one impulse response may comprise: determining direction of arrival information based on an analysis of the spatial room impulse response; determining a sound pressure level information based on the spatial room impulse response; and determining at least one early reflection which is not overlapped in time by any other reflection based on the direction of arrival information and the sound pressure level information.

Determining at least one early reflection based on the direction of arrival information and the sound pressure level information may comprise determining a time period associated with the determined at least one early reflection which is not overlapped in time by any other reflection.

Obtaining at least one reflection filter based on the obtained at least one impulse response may comprise extracting a portion of the impulse response defined by the time period associated with the determined at least one early reflection which is not overlapped in time by any other reflection.

The method may further comprise associating the at least one reflection filter with a parameter associated with the early reflection.

The parameter associated with the early reflection may comprise at least one of: a material; a material specification; and a material geometry from which the at least one early reflection which is not overlapped in time by any other reflection occurred.

The parameter associated with the early reflection may be enabled based on at least one of: at least one user input configured to select or define the parameter; virtual acoustic scene geometry and acoustic description of the material in the virtual acoustic scene geometry; and at least one visual recognition of the parameter when the parameter comprises the material, in order to associate the at least one individual reflection filter with the material.

Obtaining at least one reflection filter based on the obtained at least one impulse response may comprise: obtaining octave-band absorption coefficients of a visually recognized material; comparing an octave-band magnitude spectrum of the at least one reflection filter to the octave-band absorption coefficients of the visually recognized material; and selecting the at least one reflection filter which has the octave-band magnitude spectrum closest to the octave-band absorption coefficients of the visually recognized material.

The method may further comprise generating a database of the at least one reflection filter.

The method may further comprise storing the database of the at least one reflection filter with the associated parameter associated with the early reflection.

According to a fifth aspect there is provided a method comprising: obtaining at least one audio signal; obtaining at least one metadata associated with the at least one audio signal; obtaining at least one parameter associated with room acoustics and the at least one parameter comprises at least one of a geometry, a dimension and a material; obtain at least one reflection filter in accordance with the at least one parameter, wherein the at least one reflection filter is configured to determine at least one early reflection from at least one impulse response, which is not overlapped in time by any other reflection, wherein a duration of the at least one early reflection is shorter than a duration of the at least one impulse response; and synthesize an output audio signal based on the at least one audio signal, the at least one metadata, the at least one parameter and the at least one reflection filter.

Synthesizing an output audio signal based on the at least one audio signal, the at least one metadata, the at least one parameter and the at least one reflection filter may comprise selecting the at least one reflection filter from a database of reflection filters based on the at least one parameter associated with room acoustics.

The at least one parameter associated with room acoustics may be a material parameter.

Obtaining at least one reflection filter in accordance with the at least one parameter may comprise one of: obtaining the at least one reflection filter for each material; and obtaining a database of at least one reflection filter for each material and furthermore obtaining an indicator configured to identify the at least one reflection filter from the database.

According to a sixth aspect there is provided a method comprising: obtaining at least one impulse response, wherein the at least one impulse response is configured with a perceivable timbre during rendering; creating a timbral modification filter; obtaining at least one audio signal; and rendering at least one output audio signal based on the at least one audio signal, wherein the at least one output signal is based on an application of the timbral modification filter.

The at least one impulse response may be a room impulse response and the method may further comprise: obtaining at least one reference room impulse response, wherein the at least one reference room impulse may be configured with a perceivable reference timbre; and modifying a magnitude spectrum of the at least one room impulse response based on a frequency response of the at least one reference room impulse response while maintaining a defined directional spatial perception so to apply a timbral modification.

Modifying a magnitude spectrum of the at least one room impulse response based on a frequency response of the at least one reference room impulse response while maintaining a defined directional spatial perception may comprise: applying the timbral modification filter to the at least one room impulse response, wherein the timbral modification filter may modify a magnitude spectrum of the at least one room impulse response to be closer to a magnitude spectrum of the reference room impulse response while preserving a time structure of at least one early reflections.

The method may comprise: applying the timbral modification filter to the at least one audio signal; obtaining at least one metadata associated with the at least one audio signal, wherein rendering at least one output audio signal based on at least one audio signal may comprise synthesizing a reflection audio signal based on the timbral modified at least one audio signal.

The method may comprise separating the at least one audio signal into an early part audio signal and a late part audio signal, wherein applying the timbral modification filter to the at least one audio signal may comprise applying the timbral modification filter to the early part of the at least one audio signal and the late part of the at least one audio signal separately, and wherein rendering at least one output audio signal based on the at least one audio signal may comprise: rendering the timbral modified early part of the at least one audio signal and the timbral modified late part of the at least one audio signal separately; and combining the separately rendered timbral modified early part of the at least one audio signal and the timbral modified late part of the at least one audio signal to generate the at least one output audio signal.

Obtaining at least one reference room impulse response, wherein the at least one reference room impulse is configured with a perceivable reference timbre may comprise one of: obtaining a spatial or non-spatial room impulse response of a physical acoustic space with desired qualities; obtaining an acoustic simulation of a virtual space; performing acoustic measurement or simulation of a listener's physical reproduction space; and obtaining a monophonic impulse response of a high-quality reverberation audio effect.

According to a seventh aspect there is provided an apparatus comprising at least one processor and at least one memory including a computer program code, the at least one memory and the computer program code configured to, with the at least one processor, cause the apparatus at least to: obtain at least one impulse response; obtain at least one reflection filter based on the obtained at least one impulse response, wherein the at least one reflection filter is configured to determine at least one early reflection from an acoustic surface which is not overlapped in time by any other reflection, wherein a duration of the at least one early reflection is shorter than a duration of the obtained at least one impulse response.

The apparatus caused to obtain at least one impulse response may be caused to obtain a spatial room impulse response, the spatial room impulse response comprising the at least one individual reflection.

The apparatus caused to obtain at least one reflection filter based on the obtained at least one impulse response may be caused to: determine direction of arrival information based on an analysis of the spatial room impulse response; determine a sound pressure level information based on the spatial room impulse response; and determine at least one early reflection which is not overlapped in time by any other reflection based on the direction of arrival information and the sound pressure level information.

The apparatus caused to determine at least one early reflection based on the direction of arrival information and the sound pressure level information may be further caused to determine a time period associated with the determined at least one early reflection which is not overlapped in time by any other reflection.

The apparatus caused to obtain at least one reflection filter based on the obtained at least one impulse response may be caused to extract a portion of the impulse response defined by the time period associated with the determined at least one early reflection which is not overlapped in time by any other reflection.

The apparatus may be further caused to associate the at least one reflection filter with a parameter associated with the early reflection.

The parameter associated with the early reflection may comprise at least one of: a material; a material specification; and a material geometry from which the at least one early reflection which is not overlapped in time by any other reflection occurred.

The parameter associated with the early reflection may be enabled based on at least one of: at least one user input configured to select or define the parameter; virtual acoustic scene geometry and acoustic description of the material in the virtual acoustic scene geometry; and at least one visual recognition of the parameter when the parameter comprises the material, in order to associate the at least one individual reflection filter with the material.

The apparatus caused to obtain at least one reflection filter based on the obtained at least one impulse response may be caused to: obtain octave-band absorption coefficients of a visually recognized material; compare an octave-band magnitude spectrum of the at least one reflection filter to the octave-band absorption coefficients of the visually recognized material; and select the at least one reflection filter which has the octave-band magnitude spectrum closest to the octave-band absorption coefficients of the visually recognized material.

The apparatus may be further caused to generate a database of the at least one reflection filter.

The apparatus may be further caused to store the database of the at least one reflection filter with the associated parameter associated with the early reflection.

According to an eighth aspect there is provided an apparatus comprising at least one processor and at least one memory including a computer program code, the at least one memory and the computer program code configured to, with the at least one processor, cause the apparatus at least to: obtain at least one audio signal; obtain at least one metadata associated with the at least one audio signal; obtain at least one parameter associated with room acoustics and comprises at least one of a geometry, a dimension and a material; obtain at least one reflection filter in accordance with the at least one parameter, wherein the at least one reflection filter is configured to determine at least one early reflection from at least one impulse response, which is not overlapped in time by any other reflection, wherein a duration of the at least one early reflection is shorter than a duration of the at least one impulse response; and synthesize an output audio signal based on the at least one audio signal, the at least one metadata, the at least one parameter and the at least one reflection filter.

The apparatus caused to synthesize an output audio signal based on the at least one audio signal, the at least one metadata, the at least one parameter and the at least one reflection filter may be caused to select the at least one reflection filter from a database of reflection filters based on the at least one parameter associated with room acoustics.

The at least one parameter associated with room acoustics may be a material parameter.

The apparatus caused to obtain at least one reflection filter in accordance with the at least one parameter may be caused to perform one of: obtain the at least one reflection filter for each material; and obtain a database of at least one reflection filter for each material and furthermore obtain an indicator configured to identify the at least one reflection filter from the database.

According to a ninth aspect there is provided an apparatus comprising at least one processor and at least one memory including a computer program code, the at least one memory and the computer program code configured to, with the at least one processor, cause the apparatus at least to: obtain at least one impulse response, wherein the at least one impulse response is configured with a perceivable timbre during rendering; create a timbral modification filter; obtain at least one audio signal; render at least one output audio signal based on the at least one audio signal, wherein the at least one output signal is based on an application of the timbral modification filter.

The at least one impulse response is a room impulse response and the apparatus may be further caused to: obtain at least one reference room impulse response, wherein the at least one reference room impulse is configured with a perceivable reference timbre; and modify a magnitude spectrum of the at least one room impulse response based on a frequency response of the at least one reference room impulse response while maintaining a defined directional spatial perception so to apply a timbral modification.

The apparatus caused to modify a magnitude spectrum of the at least one room impulse response based on a frequency response of the at least one reference room impulse response while maintaining a defined directional spatial perception may be caused to: apply the timbral modification filter to the at least one room impulse response, wherein the timbral modification filter is configured to modify a magnitude spectrum of the at least one room impulse response to be closer to a magnitude spectrum of the reference room impulse response while preserving a time structure of at least one early reflections.

The apparatus may be further caused to: apply the timbral modification filter to the at least one audio signal; obtain at least one metadata associated with the at least one audio signal, wherein the apparatus caused to render at least one output audio signal based on at least one audio signal may be caused to synthesize a reflection audio signal based on the timbral modified at least one audio signal.

The apparatus may be further caused to separate the at least one audio signal into an early part audio signal and a late part audio signal, wherein the apparatus caused to apply the timbral modification filter to the at least one audio signal may be caused to apply the timbral modification filter to the early part of the at least one audio signal and the late part of the at least one audio signal separately, and wherein the apparatus caused to render at least one output audio signal based on the at least one audio signal may be caused to: render the timbral modified early part of the at least one audio signal and the timbral modified late part of the at least one audio signal separately; and combine the separately rendered timbral modified early part of the at least one audio signal and the timbral modified late part of the at least one audio signal to generate the at least one output audio signal.

The apparatus caused to obtain at least one reference room impulse response, wherein the at least one reference room impulse is configured with a perceivable reference timbre may be caused to perform one of: obtain a spatial or non-spatial room impulse response of a physical acoustic space with desired qualities; obtain an acoustic simulation of a virtual space; perform acoustic measurement or simulation of a listener's physical reproduction space; and obtain a monophonic impulse response of a high-quality reverberation audio effect.

According to a tenth aspect there is provided an apparatus comprising: obtaining circuitry configured to obtain at least one impulse response; obtaining circuitry configured to obtain at least one reflection filter based on the obtained at least one impulse response, wherein the at least one reflection filter is configured to determine at least one early reflection from an acoustic surface which is not overlapped in time by any other reflection, wherein a duration of the at least one early reflection is shorter than a duration of the obtained at least one impulse response.

According to an eleventh aspect there is provided an apparatus comprising: obtaining circuitry configured to obtain at least one audio signal; obtaining circuitry configured to obtain at least one metadata associated with the at least one audio signal; obtaining circuitry configured to obtain at least one parameter associated with room acoustics and comprises at least one of a geometry, a dimension and a material; obtain at least one reflection filter in accordance with the at least one parameter, wherein the at least one reflection filter is configured to determine at least one early reflection from at least one impulse response, which is not overlapped in time by any other reflection, wherein a duration of the at least one early reflection is shorter than a duration of the at least one impulse response; and synthesizing circuitry configured to synthesize an output audio signal based on the at least one audio signal, the at least one metadata, the at least one parameter and the at least one reflection filter.

According to a twelfth aspect there is provided an apparatus comprising: obtaining circuitry configured to obtain at least one impulse response, wherein the at least one impulse response is configured with a perceivable timbre during rendering; filter creating circuitry configured to create a timbral modification filter; obtain at least one audio signal; rendering circuitry configured to render at least one output audio signal based on the at least one audio signal, wherein the at least one output signal is based on an application of the timbral modification filter.

According to a thirteenth aspect there is provided a computer program comprising instructions [or a computer readable medium comprising program instructions] for causing an apparatus to perform at least the following: obtain at least one impulse response; obtain at least one reflection filter based on the obtained at least one impulse response, wherein the at least one reflection filter is configured to determine at least one early reflection from an acoustic surface which is not overlapped in time by any other reflection, wherein a duration of the at least one early reflection is shorter than a duration of the obtained at least one impulse response.

According to a fourteenth aspect there is provided a computer program comprising instructions [or a computer readable medium comprising program instructions] for causing an apparatus to perform at least the following: obtain at least one audio signal; obtain at least one metadata associated with the at least one audio signal; obtain at least one parameter associated with room acoustics and comprises at least one of a geometry, a dimension and a material; obtain at least one reflection filter in accordance with the at least one parameter, wherein the at least one reflection filter is configured to determine at least one early reflection from at least one impulse response, which is not overlapped in time by any other reflection, wherein a duration of the at least one early reflection is shorter than a duration of the at least one impulse response; and synthesize an output audio signal based on the at least one audio signal, the at least one metadata, the at least one parameter and the at least one reflection filter.

According to a fifteenth aspect there is provided a computer program comprising instructions [or a computer readable medium comprising program instructions] for causing an apparatus to perform at least the following: obtain at least one impulse response, wherein the at least one impulse response is configured with a perceivable timbre during rendering; create a timbral modification filter; obtain at least one audio signal; render at least one output audio signal based on the at least one audio signal, wherein the at least one output signal is based on an application of the timbral modification filter.

According to a sixteenth aspect there is provided a non-transitory computer readable medium comprising program instructions for causing an apparatus to perform at least the following: obtain at least one impulse response; obtain at least one reflection filter based on the obtained at least one impulse response, wherein the at least one reflection filter is configured to determine at least one early reflection from an acoustic surface which is not overlapped in time by any other reflection, wherein a duration of the at least one early reflection is shorter than a duration of the obtained at least one impulse response.

According to a seventeenth aspect there is provided a non-transitory computer readable medium comprising program instructions for causing an apparatus to perform at least the following: obtain at least one audio signal; obtain at least one metadata associated with the at least one audio signal; obtain at least one parameter associated with room acoustics and comprises at least one of a geometry, a dimension and a material; obtain at least one reflection filter in accordance with the at least one parameter, wherein the at least one reflection filter is configured to determine at least one early reflection from at least one impulse response, which is not overlapped in time by any other reflection, wherein a duration of the at least one early reflection is shorter than a duration of the at least one impulse response; and synthesize an output audio signal based on the at least one audio signal, the at least one metadata, the at least one parameter and the at least one reflection filter.

According to an eighteenth aspect there is provided a non-transitory computer readable medium comprising program instructions for causing an apparatus to perform at least the following: obtain at least one impulse response, wherein the at least one impulse response is configured with a perceivable timbre during rendering; create a timbral modification filter; obtain at least one audio signal; render at least one output audio signal based on the at least one audio signal, wherein the at least one output signal is based on an application of the timbral modification filter.

According to a nineteenth aspect there is provided an apparatus comprising: means for obtaining at least one impulse response; means for obtaining at least one reflection filter based on the obtained at least one impulse response, wherein the at least one reflection filter is configured to determine at least one early reflection from an acoustic surface which is not overlapped in time by any other reflection, wherein a duration of the at least one early reflection is shorter than a duration of the obtained at least one impulse response.

According to a twentieth aspect there is provided an apparatus comprising: means for obtaining at least one audio signal; means for obtaining at least one metadata associated with the at least one audio signal; means for obtaining at least one parameter associated with room acoustics and comprises at least one of a geometry, a dimension and a material; obtain at least one reflection filter in accordance with the at least one parameter, wherein the at least one reflection filter is configured to determine at least one early reflection from at least one impulse response, which is not overlapped in time by any other reflection, wherein a duration of the at least one early reflection is shorter than a duration of the at least one impulse response; and means for synthesizing an output audio signal based on the at least one audio signal, the at least one metadata, the at least one parameter and the at least one reflection filter.

According to a twenty-first aspect there is provided an apparatus comprising: means for obtaining at least one impulse response, wherein the at least one impulse response is configured with a perceivable timbre during rendering; means for creating a timbral modification filter; obtain at least one audio signal; means for rendering at least one output audio signal based on the at least one audio signal, wherein the at least one output signal is based on an application of the timbral modification filter.

According to a twenty-second aspect there is provided a computer readable medium comprising program instructions for causing an apparatus to perform at least the following: obtain at least one impulse response; obtain at least one reflection filter based on the obtained at least one impulse response, wherein the at least one reflection filter is configured to determine at least one early reflection from an acoustic surface which is not overlapped in time by any other reflection, wherein a duration of the at least one early reflection is shorter than a duration of the obtained at least one impulse response.

According to a twenty-third aspect there is provided a computer readable medium comprising program instructions for causing an apparatus to perform at least the following: obtain at least one audio signal; obtain at least one metadata associated with the at least one audio signal; obtain at least one parameter associated with room acoustics and comprises at least one of a geometry, a dimension and a material; obtain at least one reflection filter in accordance with the at least one parameter, wherein the at least one reflection filter is configured to determine at least one early reflection from at least one impulse response, which is not overlapped in time by any other reflection, wherein a duration of the at least one early reflection is shorter than a duration of the at least one impulse response; and synthesize an output audio signal based on the at least one audio signal, the at least one metadata, the at least one parameter and the at least one reflection filter.

According to a twenty-fourth aspect there is provided a computer readable medium comprising program instructions for causing an apparatus to perform at least the following: obtain at least one impulse response, wherein the at least one impulse response is configured with a perceivable timbre during rendering; create a timbral modification filter; obtain at least one audio signal; render at least one output audio signal based on the at least one audio signal, wherein the at least one output signal is based on an application of the timbral modification filter.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for parameterizing and rendering audio scenes comprising audio elements such as objects, channels, parametric spatial audio and higher-order ambisonics (HOA), and audio scene information containing geometry, dimensions, acoustic materials, and object properties such as directivity and spatial extent. In addition, there can be various metadata which enable conveying the artistic intent, that is, how the rendering should be controlled and/or modified as the user moves in the scene.

Figure 1:
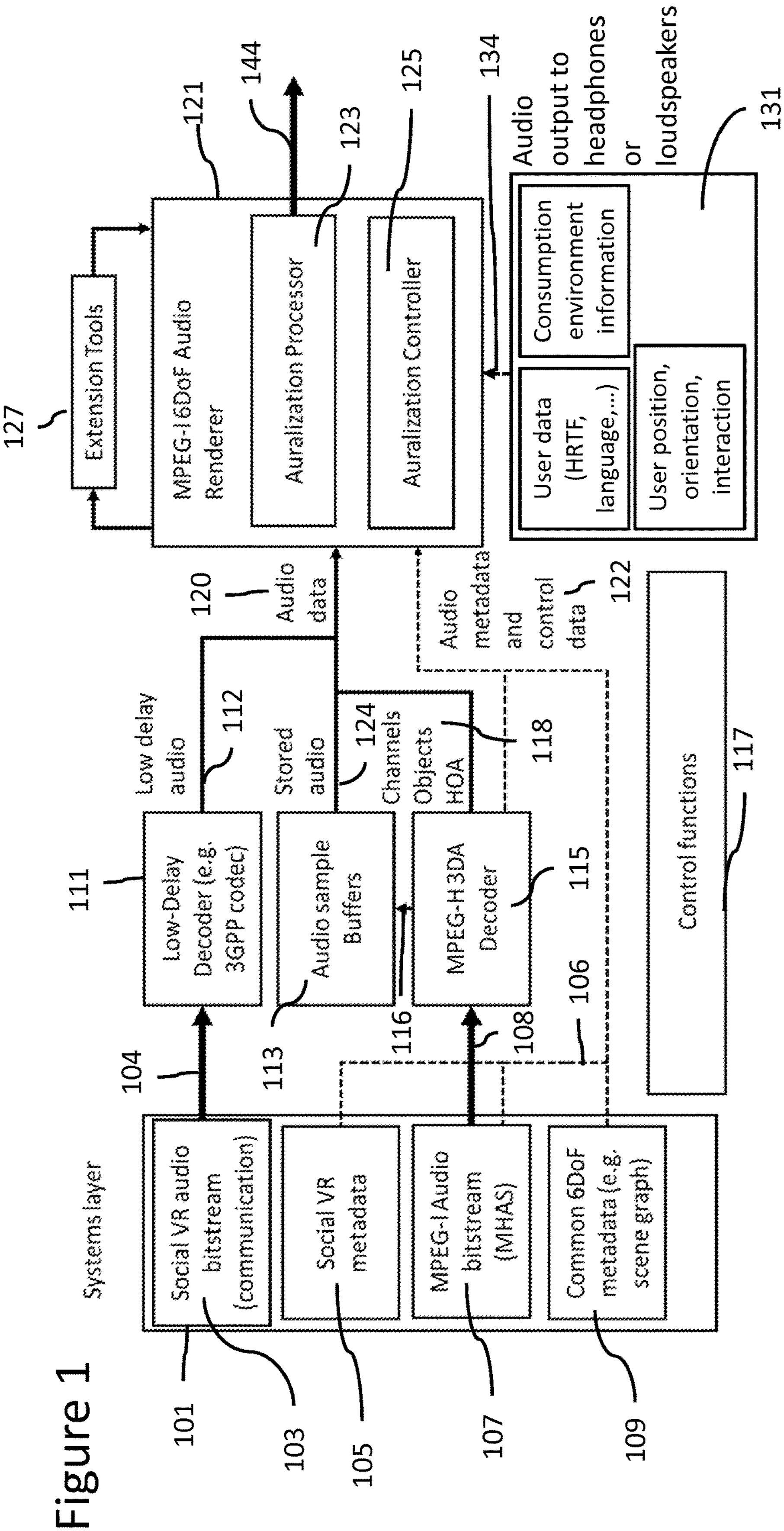
FIG. 1 shows schematically an example MPEG-I reference architecture within which some embodiments may be implemented.

Before discussing the embodiments in further detail we will discuss an example MPEG-I encoding, transmission, and rendering architecture. For example with respect to FIG. 1 is shown a reference architecture for an MPEG-I system.

The system shows a systems layer 101. The systems layer 101 comprises bitstreams and other data inputs. For example as shown in FIG. 1 the systems layer 101 comprises a social virtual reality (VR) audio bitstream (communication) 103 configured to obtain or generate a suitable audio signal bitstream 104 which can be passed to a low-delay decoder 111. Furthermore the systems layer 101 comprises social VR metadata 105 configured to obtain or generate suitable VR metadata which can be output as part of audio metadata and control data 122 to a renderer 121. The systems layer 101 can furthermore comprise MPEG-I audio bitstream (MHAS) 107 which is configured to obtain or generate suitable MPEG-I audio signals 108 and which can be output to a MPEG-H 3DA decoder 115. Additionally the MPEG-I audio bitstream (MHAS) 107 can be configured to obtain or generate suitable audio metadata 106 which can form part of the audio metadata and control data 122 output to the renderer 121. The systems layer 101 comprises common 6-Degrees-of-freedom (6DoF) metadata 109 configured to obtain or generate suitable 6DoF metadata such as scene graph information which can be output as part of audio metadata and control data 122 to a renderer 121.

The system shows control functions 117 which is configured to control the decoding and the rendering operations.

The system shows a low-delay decoder 111, which may be configured to receive the social virtual reality (VR) audio bitstream 104 and generate a suitable low delay audio signal 112 which can be output as part of audio data 120 passed to the renderer 121. The low-delay decoder 111 can for example be a 3GPP codec.

The system furthermore may comprise a MPEG-H 3DA decoder 115, which may be configured to receive the MPEG-I audio bitstream output 108 and generate audio elements such as objects, channels, or higher order ambisonics (HOA) 118 which can be output as part of audio data 120 passed to the renderer 121. The MPEG-H 3DA decoder 115 can furthermore be configured to output the decoded audio signals to an audio sample buffer 113.

The system furthermore may comprise an audio sample buffer 113 which is configured to receive the output of the MPEG-H 3DA decoder 115 and store it. The stored audio 124 (such as the audio elements such as objects, channels, or higher order ambisonics) can be output as part of audio data 120 passed to the renderer 121. The audio sample buffer 113 is configured to store audio effect samples. For example the audio sample buffer 113 can in some embodiments be configured to store audio samples such as earcons which can be triggered when needed. Earcons are a common feature of computer operating systems and applications, ranging from a simple beep to indicate an error, to the customizable sound schemes of modern operating systems that indicate startup, shutdown, and other events. It would be appreciated that not all audio content is passed to or through the audio sample buffers 113.

The system may comprise user inputs 131 such as user data (head related transfer function, language), consumption environment information, and user position, orientation or interaction information and pass these inputs 131 as user data 134 to the renderer 121.

Additionally the system may further comprise extension tools 127 configured to receive data from the renderer 121 and further output processed data back to the renderer. For example the extension tools 127 may be configured to operate as an external renderer for audio data not able to be rendered by the renderer 121.

The system furthermore may comprise a renderer (a MPEG-I 6DoF Audio renderer) 121. The renderer 121 is configured to receive audio data 120, audio metadata and control data 122, user data 134 and extension tool data. The renderer is configured to generate suitable audio output signals 144. For example the audio output signals 144 can comprise headphone (binaural) audio signals or multichannel audio signals for loudspeaker (LS) playback.

The renderer 121 in some embodiments comprises an auralization controller 125 configured to control the rendering process. The renderer 121 further comprises an auralization processor 123 configured to generate the audio output 124.

Figure 2:
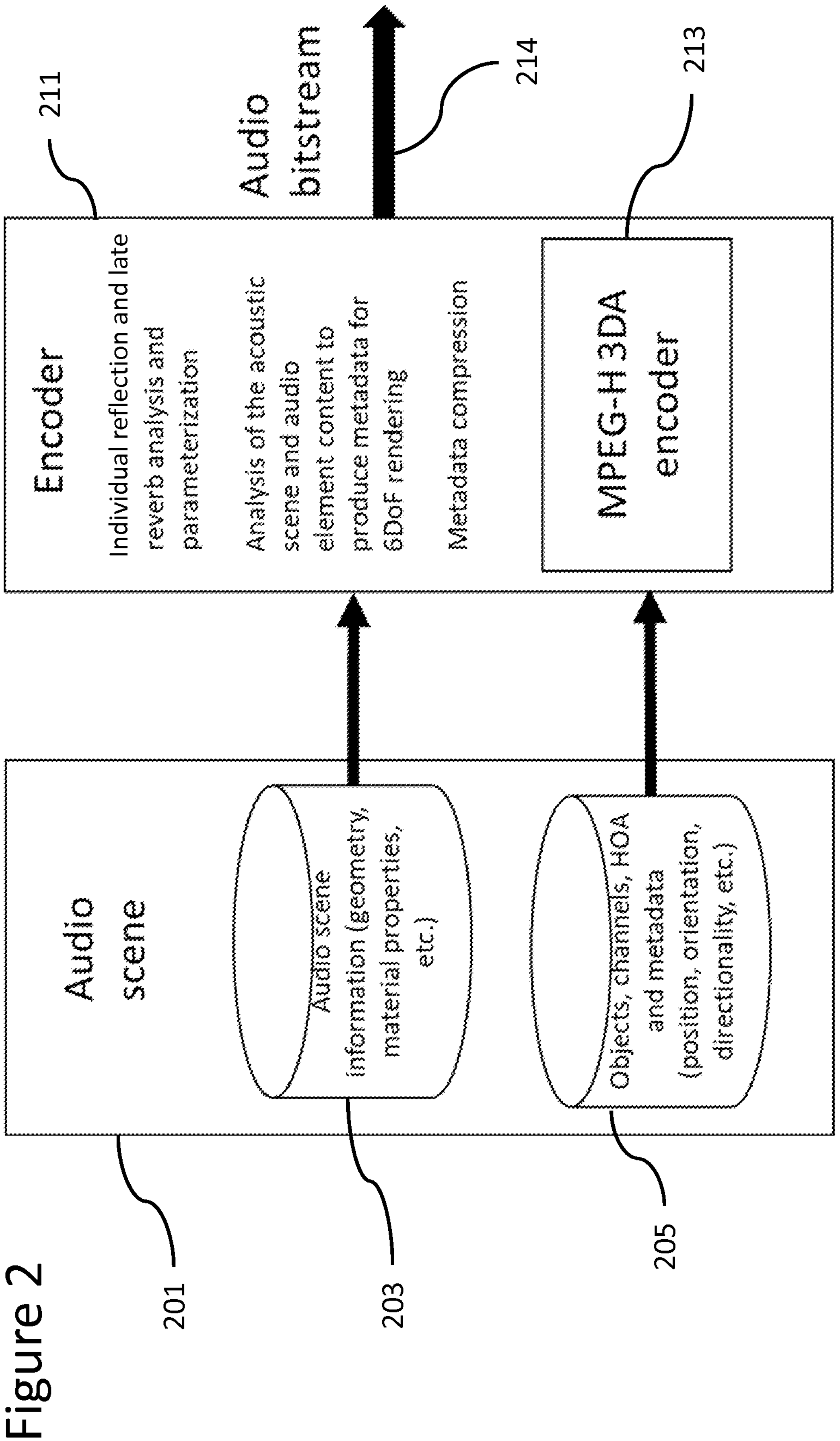
FIG. 2 shows schematically an example MPEG-I audio system within which some embodiments may be implemented.

With respect to FIG. 2 is shown a further example of a MPEG-I encoder system. The MPEG-I encoder system shown features the audio scene 201. The audio scene 201 can be a synthesized scene (in other words at least partially generated artificially) or a real world scene (in other words a captured or recorded audio scene). The audio scene 201 comprises the audio scene information 203 which contains information on the audio scene. For example the audio scene information 203 can define the geometry of the scene (such as positions of the walls), the material properties of the scene (such as acoustic parameters of materials in the scene) and other parameters related to the audio scene. The audio scene 201 may furthermore comprise the audio signal information 205. The audio signal information 205 can comprise audio elements as objects, channels, HOA and metadata parameters such as source position, orientation, directivity, size etc.

The system further comprises an encoder 211, for example an MPEG-H 3DA encoder 213, which is configured to receive the audio scene information, and the audio signal information and encode the audio scene parameters into a bitstream.

In some embodiments as described hereafter the encoder can be configured to perform early reflection and late reverberation analysis and parametrization. Additionally the encoder can be configured to perform analysis of the acoustic scene and audio element content to produce metadata for a 6DoF rendering. Additionally the encoder 211 is configured to perform metadata compression. The audio bitstream 214 can then be output.

As discussed above the modelling and simulation of reverberation in rendering systems is a currently researched topic. Simulation of reverberation is often required in rendering of object audio and more generally any acoustically dry sources to enhance the perceived quality of reproduction. More accurate simulation is desired in interactive applications where virtual sound sources (i.e., audio objects) and the listener can move in an immersive virtual space. For true perceptual plausibility of the virtual scene, perceptually plausible reverberation simulation is required.

Simulation of reverberation can be done in various ways. A suitable and common approach is to simulate the direct path, early reflections, and late reverberation somewhat separately based on an acoustic description of a virtual scene. This applies especially for the current envisioned MPEG-I standard.

Figure 3:
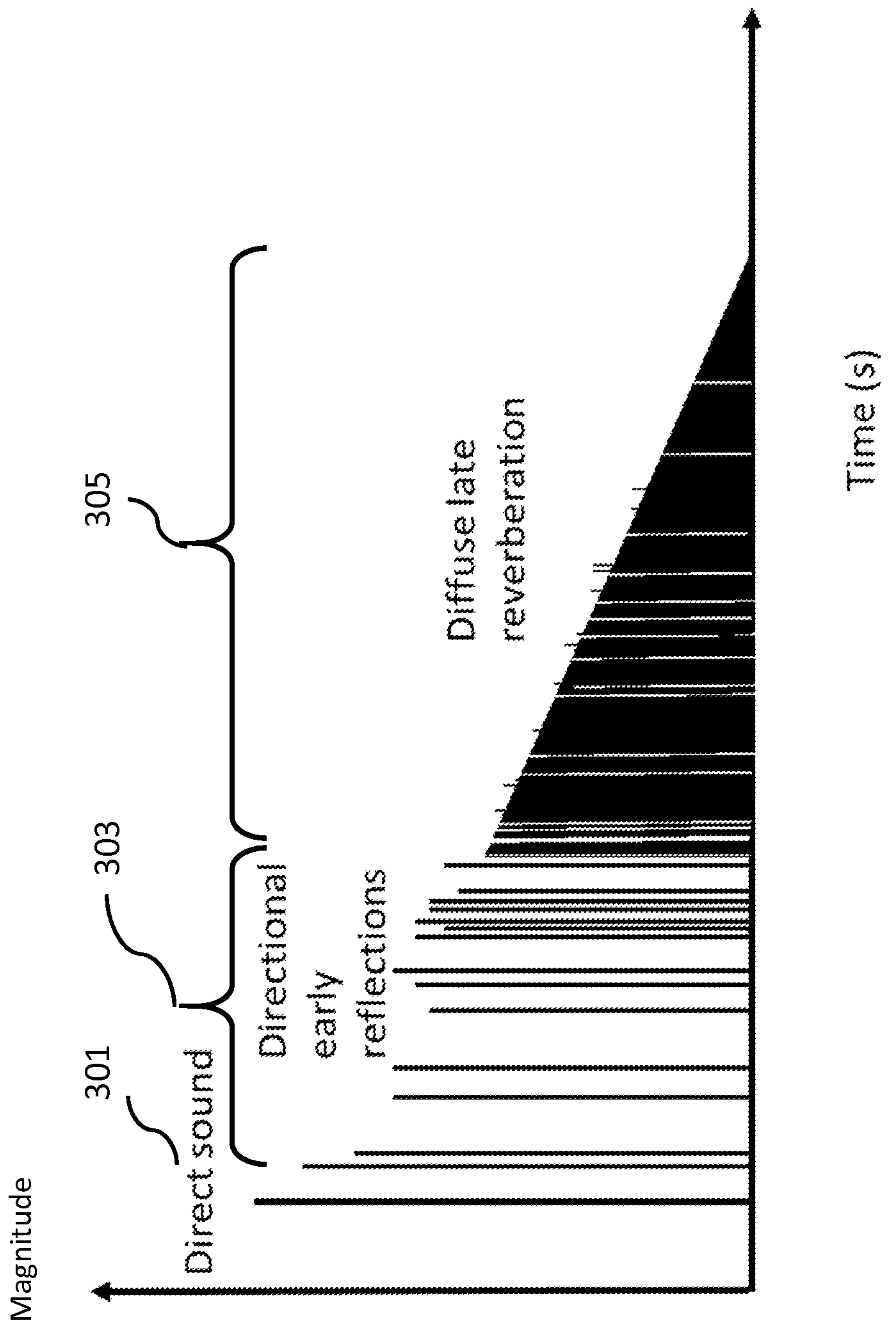
FIG. 3 shows a model of room impulse response.

An example of the modelling of the direct path, early reflections, and late reverberation for an audio source within a room is shown in FIG. 3. FIG. 3 shows a graph of detected event magnitudes against time. The graph therefore shows the direct sound event 301 which is the audio signal received from an audio source directly. The graph thus shows a first (direct sound) event or impulse 301 which is the sound wave propagating on the direct path from audio source to the listener or microphone.

Following the first event or impulse 301 is a series of (directional early reflection) events or impulses 303. The directional early reflection events or impulses are those separately detectable events which are generated when the sound wave from the audio source is reflected from room surfaces.

Then there may be further (diffuse reflection) events or impulses 305. The diffuse reflection events or impulses are the effect of the sound wave from the audio source having been reflected off multiple surfaces and the reflection events are no more separately detectable.

In other words after detecting the 'direct' sound in other words the sound from the audio source to the listener/microphone with no reflections, the listener hears directional early reflections from room surfaces. After some point, individual reflections can no longer be perceived but the listener hears diffuse, late reverberation as the sound source energy has been reflected off multiple surfaces in multiple directions. Some early reflections do contain reflections that have reflected from multiple surfaces or may even be a superposition of multiple concurrent reflections. The difference between early reflections and late reverberation is the possibility to separate between detected reflection events.

When a recording is performed in a real room (e.g., by reproducing test signal through a loudspeaker) and then the same signal is rendered as an object signal with simulation of the room, the result is not equal quality with computationally efficient (i.e., suitable for real-time interactive rendering) methods.

The cause for this disparity between efficient simulation and real capture is the inability to efficiently capture the substantial amount of different effects happening in a room (material and air absorption, diffraction, scattering from wall elements) that contribute to the density and spectral quality of reflections. For example, typically individual reflections are filtered with synthetic material filters which are implemented, e.g., as low order infinite impulse response (IIR) filters. These filters to some extent emulate the frequency dependent material absorption properties of different materials but more complex acoustic effects are neglected by this approach.

The disparity between efficient simulation and a real capture is more of an effect with early reflections than with late reverberation as early reflections cause clear comb-filtering when summed in the listener's ears with the direct sound. This allows the listener to perceive the space correctly but also applies a spectral colouration. The difference in spectral colouration between simulation and capture is often perceived as loss of quality. For late reverberation, this colouration is usually less of a problem as the sheer density of reflections combined with large enough delay compared to the direct sound causes the comb-filter effect to be perceptually less meaningful.

Thus, the spectral colouration of early reflections should match closely to the spectral colouration caused by a similar real room.

Furthermore 6-DoF rendering adds the additional specific requirement that the reverberation rendering needs to be interactive in real time. Using convolution becomes practically impossible as there needs to be a database of impulse responses for each position and a way to interpolate between them. This leads to very high storage demands or, if the impulse responses are generated dynamically at each source-listener position, to very high computational demands.

The implementation of simulation of reverberation provides complete control of sound source and listener positions. However, simulations make a trade-off between accuracy (and quality) of the result and the computational cost of the simulation. If an accurate match of the real space is desired, then simulation needs to be of very high-quality. This leads to very high computational cost and computation is hard to achieve in real time. By simplifying the simulations to reduce the computational cost, perceptually good quality can be achieved, but hardly ever achieve the desired realistic sounding reverberation.

The concept as discussed in the embodiments hereafter thus is related to immersive audio coding and specifically to representing, encoding, transmitting, and synthesis of reverberation in spatial audio rendering systems. It can in some embodiments be applied to immersive audio codecs such as MPEG-I and 3GPP IVAS.

In some embodiments as discussed herein there are described apparatus and methods for extracting individual reflection filters from measured spatial impulse responses which may be employed in rendering operations to provide spatial audio signals to suitable output apparatus. A measured individual reflection filter characterizes a clean individual reflection from an acoustic surface in a room and is substantially shorter than a complete room impulse response and is not overlapped in time by other reflections. Although a room may be an interior or fully enclosed space or volume it would be understood that some embodiments may be implemented in an exterior space which comprises one or more reflecting surfaces. Similarly the room may be one in which is an interior space with one or more reflecting surfaces and one or more surfaces which are located sufficiently far from the audio source or microphone that the reflecting surface is located at an 'infinite' distance.

These embodiments can be summarized as:

- receiving a spatial room impulse response (RIR) containing at least one clean individual reflection;
- performing spatial decomposition to determine the direction of arrival (DOA) for time samples in the spatial RIR;
- using the determined DOA and a sound pressure level of the spatial RIR to determine the position of at least one clean individual reflection which is not overlapped in time by other individual reflections;
- extracting the portion of the spatial RIR containing the clean individual reflection and converting into filter coefficients;
- associating the extracted filter coefficients with the material from which the clean individual reflection occurred; and
- storing (or transmitting) the extracted filter coefficients along with the material association in a database.

In some embodiments there are apparatus and methods which create a bitstream for an immersive audio renderer using the collected database of individual reflection filters. These embodiments may be summarized as:

- obtaining input virtual acoustic scene geometry and acoustic description of the materials in the virtual acoustic scene geometry OR at least one visual recognition of a material;
- obtaining individual reflection filters for each of the materials (from the virtual scene geometry or visually recognized from the reproduction environment), in some embodiments this is performed by matching the octave-band magnitude spectrum of measured individual reflection filters to the octave-band absorption coefficients of the material, and selecting the filter giving the closest match. In the case of visually recognized material, this is preceded by obtaining the octave-band absorption coefficients of the visually recognized material. Furthermore in some embodiments these filters are minimum phase finite impulse response (FIR) filters;
- if some material is lacking a measured material filter, then obtain a synthetic material filter which approximates the octave-band absorption coefficients of the material; and
- write into bitstream the material ID's and associated measured individual reflection filter coefficients (or, if only a synthetic filter was available then its coefficients).

In some embodiments instead of sending the full filter in the bitstream, a predefined individual reflection filter database is stored in the renderer (or decoder) and encoder and the encoder is configured to send an indicators or indices in the bitstream. The decoder or renderer is configured to receive the indicators or indices and from these identify the filters.

In some embodiments there is apparatus or methods for an immersive audio renderer having an early reflection synthesis part, where the early reflections are individually synthesized using room description parameters including sound propagation delay, sound level, direction of arrival and material reflection filter. The material reflection filter in some embodiments may be a measured real individual reflection filter (in other words determined by analysis of the audio signals) or may be obtained from the bitstream (in other words the filter parameters received from the bitstream) or from a database based on the bitstream (in other words signalled from an indicator or index).

As such some embodiments aim to accurately produce the spectral colouration caused by early reflections in a real room in a virtual acoustic renderer by collecting a database of measured individual reflection filters, signalling these filters to the renderer and then using these signalled filters in the real-time virtual acoustic rendering of discrete early reflections. In some embodiments there is also the aim to produce more accurately the spectral colouration caused by early reflections in a real reproduction environment by either extracting at least one individual reflection filter from an acoustic measurement done in the reproduction environment or by visual recognition of at least one material of at least one geometric surface of the reproduction environment.

In some embodiments a user input can be configured to select or define the at least one material. In other words rather than automatic visual recognition of the material the selection may be semi-automated (with assistance of the user) or selected manually by the user.

In some embodiments extracting individual reflection filters and forming a database of them is performed on an encoder device. In some embodiments the individual reflection filters are included in an audio bitstream associated with a virtual audio scene. Furthermore in some embodiments the bitstream is then used in a real-time virtual acoustic renderer in the synthesis of discrete early reflections.

In some embodiments there is a production of a database of individual reflection filters corresponding to a specific reflecting surface type. This reflection filter will contain a substantial number of the acoustic effects to the signal caused by that reflection. This is an enabler for some further embodiments, which are the audio bitstream containing at least one individual reflection filter from the database selected based on at least one material definition associated with a virtual scene description and the renderer using at least one individual reflection filter. The renderer uses the individual reflection filters for the synthesis of individual reflections.

In some embodiments a database of individual reflections is obtained. As discussed above the database can then be used to select individual reflection filters to be used in modelling acoustic material dependent filtering in the early reflection part of the reverberation.

The obtaining of the database can be implemented in some embodiments based on a Spatial Decomposition Method (SDM) used in analysis of room reverberation. In this case, it is implemented in such a way to automatically separate complete spatial room impulse responses into individual reflections. This for example can be achieved by first obtaining the SDM analysis result (sample-wise direction-of-arrival for the time domain signal) and then studying the obtained directions and sound pressure level (SPL) of the signal for similar time frames, to obtain a confidence value for each time moment indicating if there is a clean individual reflection or not. When an individual reflection is detected, it is extracted from the impulse response to obtain an individual reflection filter. These individual reflection filters can then be further classified (e.g., what wall material the reflection corresponds to) to obtain a suitable database for rendering purposes.

In some embodiments a bitstream is created based on a virtual scene geometry and its material definitions, so that measured individual reflection filter coefficients are included in the bitstream for acoustic materials contained in the virtual scene geometry definition.

In some further embodiments the measured individual reflection filters can be employed to render spatial audio signals. For each early reflection, there can be one filter, or a cascade of multiple filters (based on the implementation). As these filters contain the effects of a real room reflection, they produce significantly more complex effects in terms of spectrum than an existing efficient simulation can achieve. These effects result in a perceptually more plausible reverberation that is closer to the real room reverberation while maintaining an efficient implementation.

Additionally some embodiments relate to immersive audio coding and specifically to synthesis of reverberation in spatial audio rendering systems. The specific focus is in 6. DoF use cases which can be applied to the rendering part of such immersive audio codecs as MPEG-I and 3GPP IVAS which are targeted for VR and AR applications.

In such embodiments there can be provided apparatus and methods for creating and applying a timbral modification filter in interactive spatial reverberation rendering to achieve perceptual quality close to a real room reverberation in a computationally efficient manner. The apparatus and methods can be summarized as:

- obtaining a simulated spatial room impulse response and a high-quality reference room impulse response; and
- modifying the perceived timbre of the simulation such that it is closer to the timbre of the reference while maintaining the directional spatial perception created by the simulation.

The apparatus and associated methods may in some embodiments automatically create and apply a timbral modification filter. Additionally the apparatus and methods may in some embodiments define where the timbral modification filter modifies the magnitude spectrum of the simulated spatial room impulse response to be closer to the magnitude spectrum of the high-quality reference while preserving the time structure of the individual reflections of the simulation.

In some embodiments the spatial room response simulation is created with any computationally efficient method that is suitable for interactive applications and the reference room impulse is any of the following:

- (Spatial or non-spatial) room impulse response of a physical acoustic space with desired qualities;
- High-quality acoustic simulation of a virtual space; or
- Acoustic measurement or simulation of the listener's physical reproduction space (specifically for the AR case).

The embodiments thus may present an impulse response modification method that combines the interactive spatiality of a simulated room impulse response with the perceptually plausible and pleasant timbre of a real room impulse response. Such embodiments for timbral modification are described herein within a complete system including object-based audio rendering. Several example embodiments are presented here and to help understand them, an overview of the timbral modification method is also presented.

The timbral modification method can be simplified into a few critical steps as follows:

- obtaining a simulated spatial room impulse response (known further as source) of the virtual room intended for 6 DoF rendering of objects;
- obtaining a reference room impulse response (known further as target) from a database, bitstream, or any other place;
- processing the above source and target room impulse responses to create a timbral modification filter; and
- applying the timbral modification filter to the source impulse response and rendering reverberation with it.

In other words in some embodiments there is the aim to produce a combined room impulse response that has the magnitude response of the target (which in theory, mostly defines the timbre, i.e., "how it sounds", of the reverberation) and phase response of the source (which defines the time structure of the reverberation).

Figure 4:
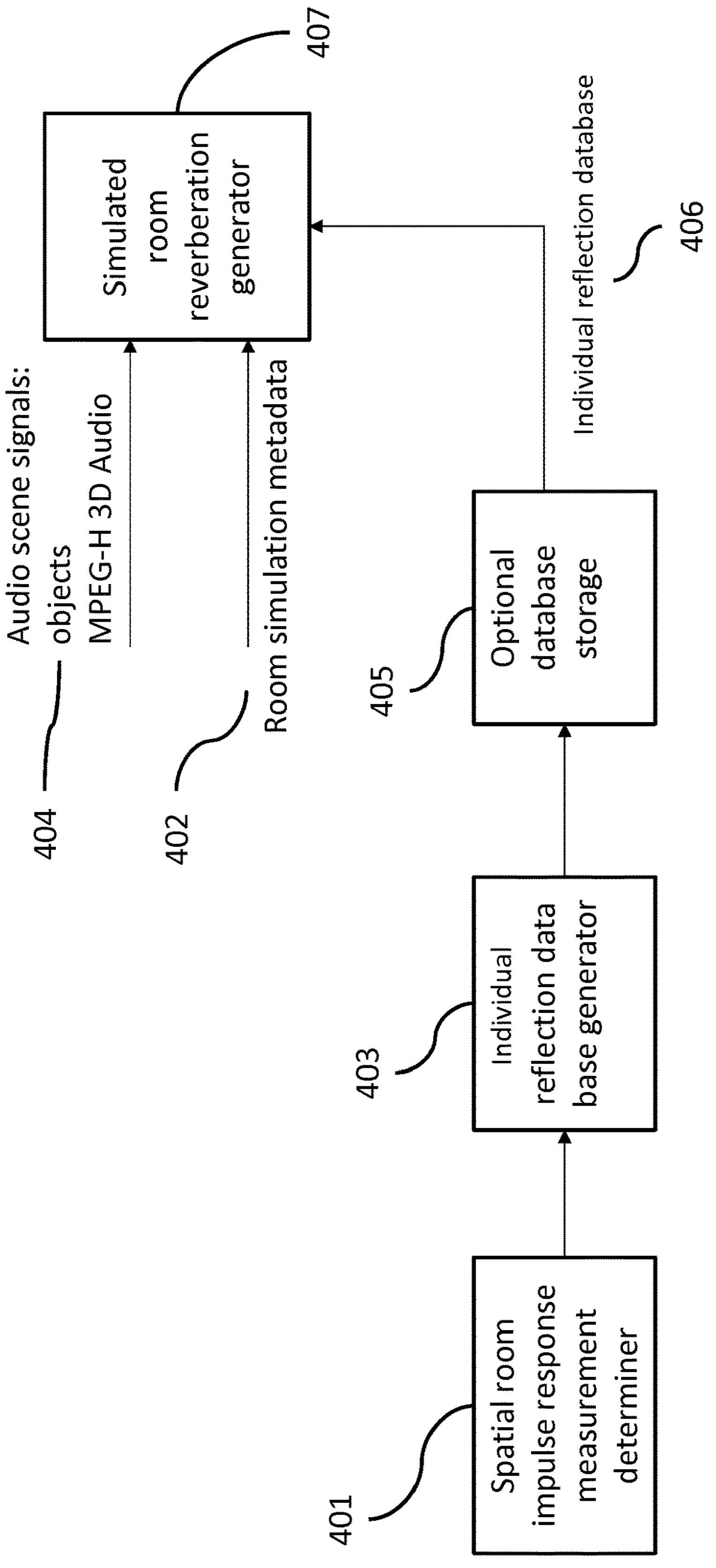
FIG. 4 shows schematically an example room reverberation system according to some embodiments.

With respect to FIG. 4 an example system according to some embodiments is shown.

The system shows for example a spatial room impulse response measurement determiner 401. The spatial room impulse response measurement determiner 401 is configured to measure the spatial room impulse response and pass this to an individual reflection database generator 403.

In some embodiments the system comprises an individual reflection database generator 403, which is configured to receive the spatial room impulse response measurements and process these to generate the individual reflection database.

FIG. 4 furthermore shows a database storage 405 which can be an optional aspect and thus optionally store the database. In other embodiments the obtained database can be directly transmitted to a simulated room reverberation generator 407.

In some embodiments the system comprises a simulated room reverberation generator 407. The simulated room reverberation generator 407 is configured to receive the obtained database 406, either directly from the generator 403 or from storage 405. Furthermore the simulated room reverberation generator 407 is configured to receive the audio scene signals (for example the audio objects or MPEG-H 3D audio) and generate simulated room reverberation audio signals. In other words the simulated room reverberation generator 407 is configured to receive direct audio and output both direct audio and reverberation audio as the reverberation generator provides the modelled delay and attenuation (due to distance). In some embodiments the paths (direct audio, early reflections and late reverberation) can be separate.

Figure 5:
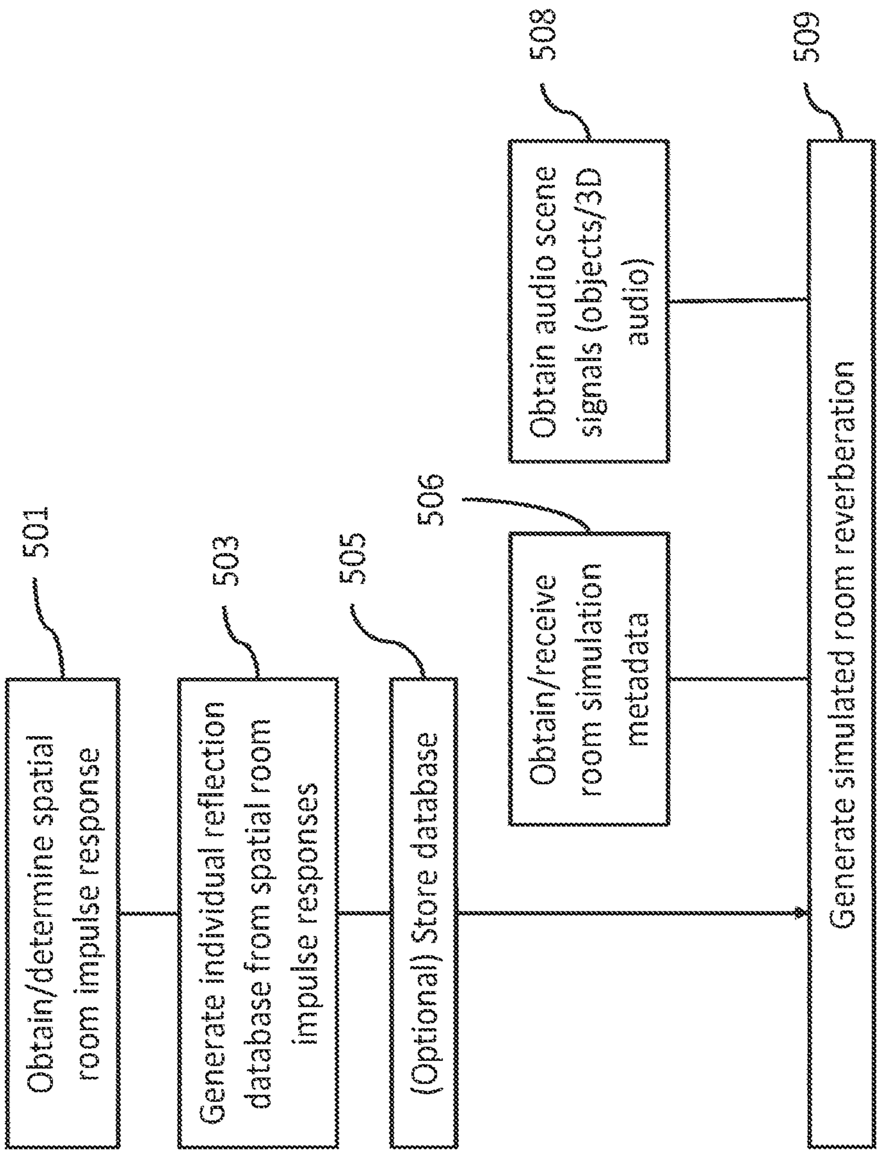
FIG. 5 shows a flow diagram of the operation of the example room reverberation system as shown in FIG. 4 according to some embodiments.

FIG. 5 thus shows a flow diagram of the operation of the system shown in FIG. 4. The spatial room impulse response is obtained or determined as shown in FIG. 5 by step 501.

Then the individual reflection database is generated from the spatial room impulse responses as shown in FIG. 5 by step 503.

Optionally the database can be stored as shown in FIG. 5 by step 505.

Additionally the room simulation metadata can be obtained or received as shown in FIG. 5 by step 506.

Also the audio scene signals are obtained or received as shown in FIG. 5 by step 508.

Having obtained or received the audio scene signals, the room simulation metadata and the database then the simulated room reverberation audio signals are generated based on the obtained or received components as shown in FIG. 5 by step 509.

Figure 6:
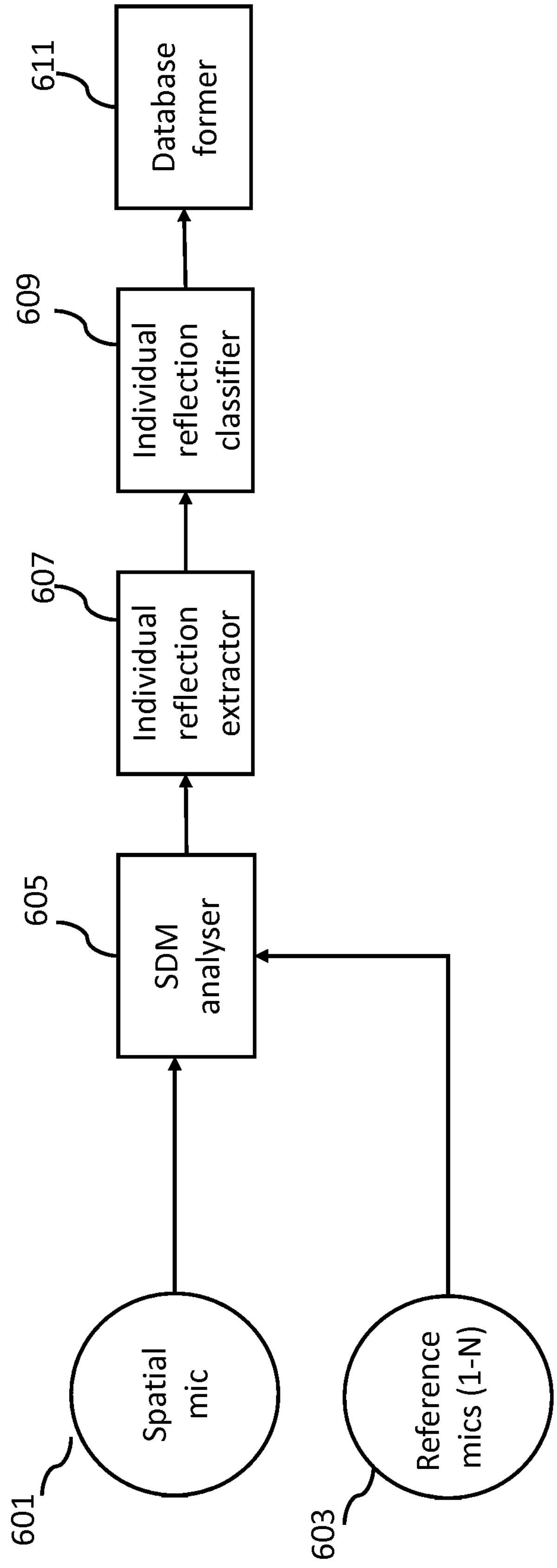
FIG. 6 shows schematically an example individual reflection database generator according to some embodiments.
Figure 7:
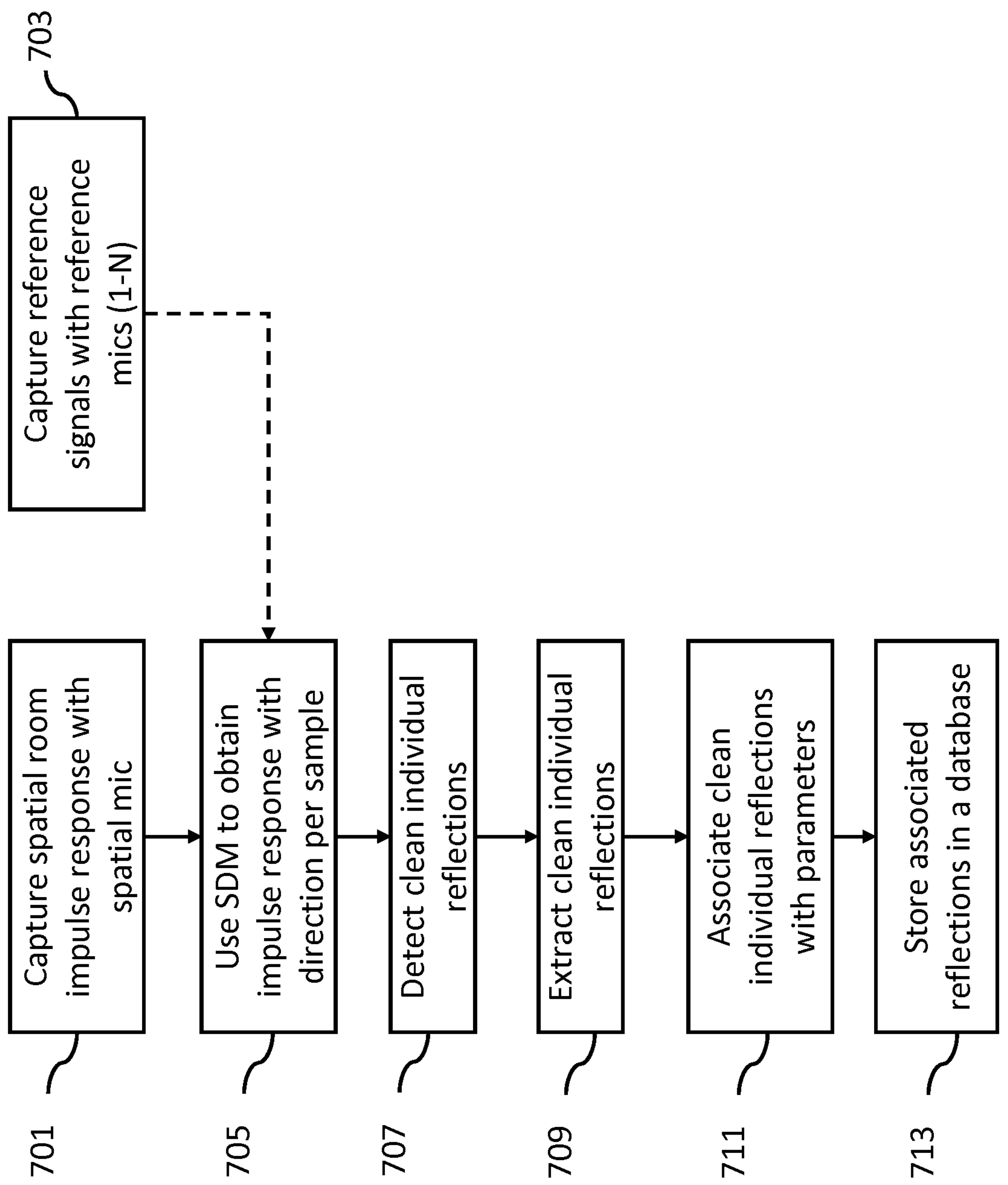
FIG. 7 shows a flow diagram of the operations of the example individual reflection database generator according to some embodiments.

With respect to FIG. 6 is shown an example spatial room impulse response measurement determiner 401 and individual reflection database generator 403. Furthermore with respect to FIG. 7 is shown the operation of the example spatial room impulse response measurement determiner 401 and individual reflection database generator 403.

The spatial room impulse response measurement determiner 401 can for example be implemented as a capture of spatial room impulse response in a space. This capture can be performed with a suitable spatial microphone 601 (e.g., G.R.A.S. Vector intensity probe, or any other). In addition, at least one reference microphone capture is made at the same time with a reference microphone 603. The reference microphone can also be one of the microphones in the spatial microphone array as long as it does not impose excess spectral colouration on the signal.

The reference microphone 603 directivity should be strictly omnidirectional, or close to it. In the latter case, signal correction can be applied to make the reference as omnidirectional as possible.

Spatial room impulse response captures can be implemented with a high sampling rate (such as 192 kHz) to enable better separation of reflections. However, lower sampling rates can be used in case the reflections are well separated from each other.

The capturing of the spatial room impulse response with the spatial microphone is shown in FIG. 7 by step 701.

The capturing of the reference signals with the reference microphone(s) is shown in FIG. 7 by step 703.

In some embodiments the database generator 403 comprises an SDM analyser 605. The spatial decomposition method (SDM) analyser 605 is configured to obtain direction of arrival (DOA) estimates for each time sample of the response. The analysis window for the SDM can be any suitable window as long as the corresponding distance covers the whole microphone array given the sampling rate and speed of sound, e.g. 64 samples for the sampling rate of 192 kHz. The DOA estimates can be further interpolated for a non-centred reference microphone by using the microphone position and plane-wave assumption.

Figure 8:
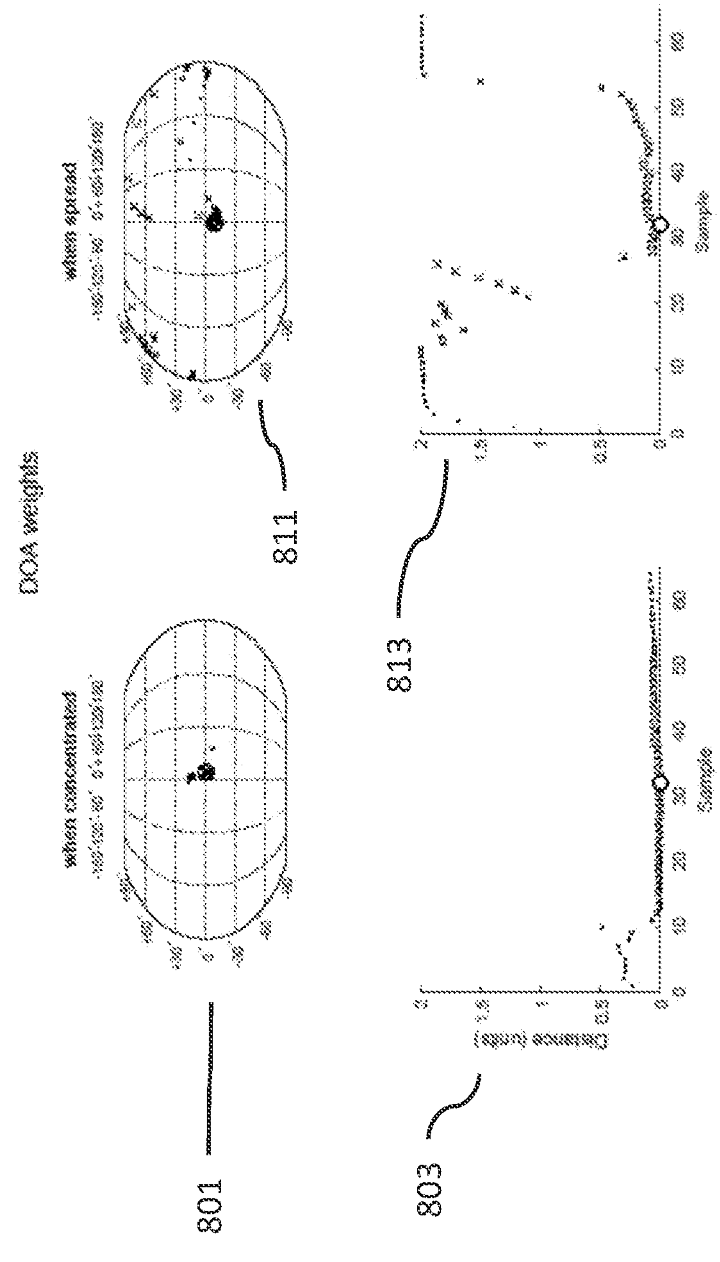
FIG. 8 shows example direction of arrival weights in concentrated and spread examples on the surface of a sphere.

The SDM analyser 605 may then be configured to weight the DOA values to create a DOA detection data track. Examples of the DOA tracks and weights are shown with respect to FIG. 8. FIG. 8 for example shows DOA weights for concentrated 801 and spread 811 examples. Furthermore is shown the track over samples as shown with respect to concentrated track 803 and spread track 813 graphs. This weighting and track generation operation can be implemented in two steps. In the first step, for each sample in the signal, the Euclidean distance between the current DOA sample and the samples before and after it are determined. This is done in a certain time window, e.g. 32 samples both forward and backward for the sampling rate of 192 kHz. In the second step, these distances are weighted with a Gaussian window centred at the current DOA sample and summed in order to form the DOA weights. The created weight represents the average displacement of the neighbouring DOAs around that specific DOA sample.

Figure 9:
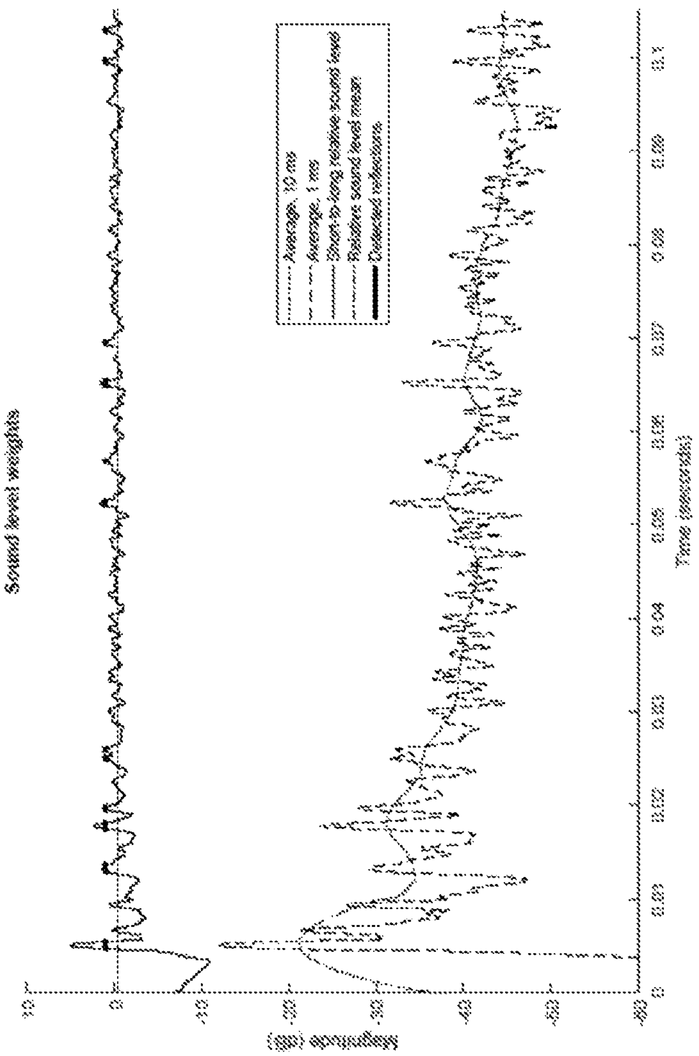
FIG. 9 shows example sound level weight calculation and individual reflection detection.

In some embodiments a sound power detection data track is also formed. This can be determined by calculating sound pressure level (SPL) with two windows, short (e.g., 1.3 ms) and long (e.g., 13 ms), and determining a long-to-short SPL ratio. From this ratio track, samples that are above certain limit (e.g., 3 scaled median absolute deviations above median) are selected. The SPL detection track is then further smoothed (e.g., with a 64-sample Gaussian window). An example of the sound power detection data track is shown in FIG. 9.

The operation of generating the impulse response with direction per sample (and furthermore the sound power detection data track) is shown in FIG. 7 by step 705.

In some embodiments the database generator 403 comprises an individual reflection extractor 607. The individual reflection extractor 607 is configured to detect and extract from the tracks provided by the SDM analyser 605 individual reflections.

The individual reflection extractor 607 can thus in some embodiments detect the clean individual reflections in the data. The detection of clean individual reflections in the data is shown in FIG. 7 by step 707.

Figure 10:
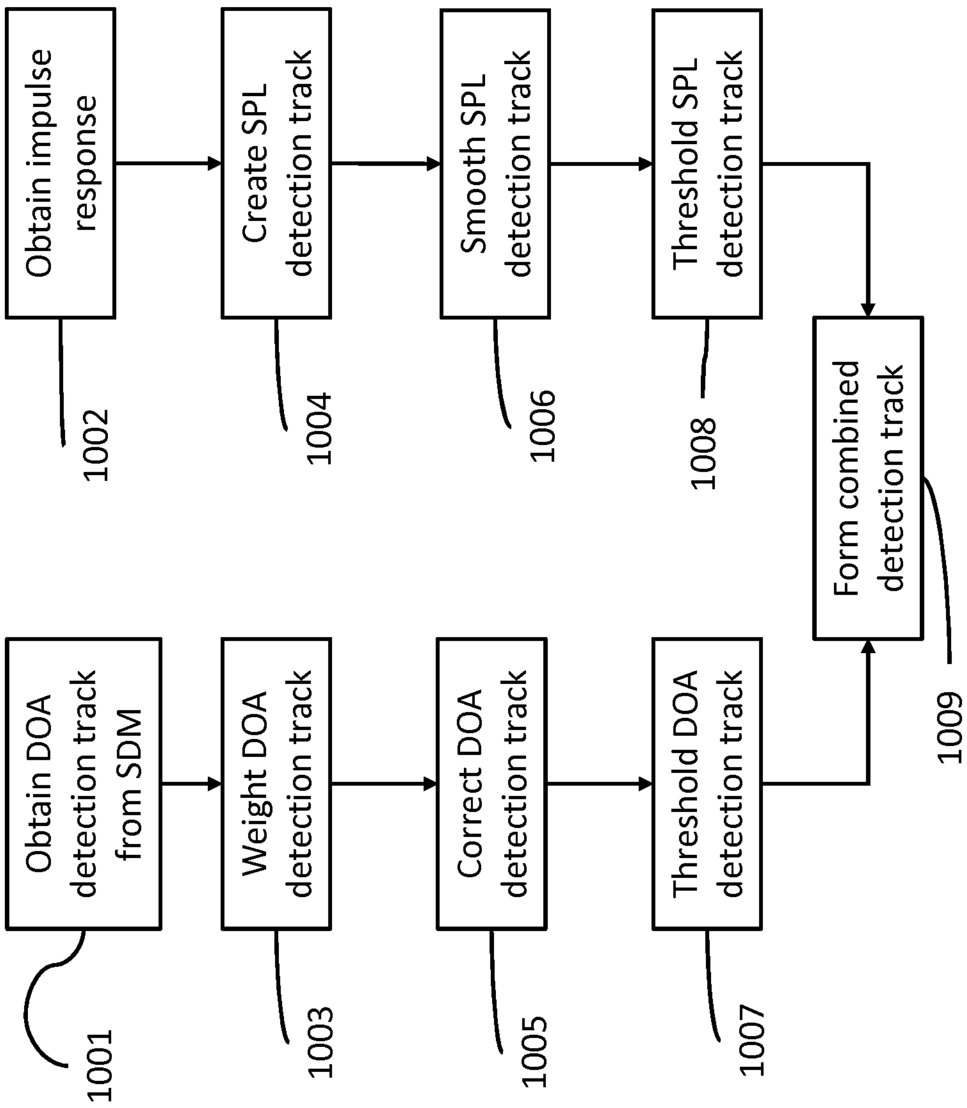
FIG. 10 shows a flow diagram of the operations of the example clean individual reflection detection process according to some embodiments.

With respect to FIG. 10 is shown an example operation of the individual reflection extractor.

The individual reflection extractor 607 in some embodiments is configured to first apply a threshold to both DOA and SPL detection tracks.

For example with respect to the DOA detection tracks (the left side of FIG. 10) the following operations can be performed.

The DOA detection track is obtained as shown in FIG. 10 by step 1001.

Then the DOA detection track weighted as shown in FIG. 10 by step 1003.

The DOA detection track is then corrected as shown in FIG. 10 by step 1005.

The threshold may be implemented by selecting all data that is within certain angular displacement inside a reference direction (e.g. 5°). The thresholding of the DOA detection track is shown in FIG. 10 by step 1007.

With respect to the SPL detection track (the right side of FIG. 10) the following operations can be performed.

The impulse response is obtained as shown in FIG. 10 by step 1002.

Then the SPL detection track is created as shown in FIG. 10 by step 1004.

The SPL detection track is then smoothed as shown in FIG. 10 by step 1006.

The threshold for the SPL detection track is selected such that values which are not zero are selected. The thresholding of the SPL track is shown in FIG. 10 by step 1008.

These two thresholded data tracks are then combined and when both of them suggest a detection, clean individual reflection is marked to be detected. This forms the combined detection track. The generation of the combined detection track is shown in FIG. 10 by step 1009.

In some embodiments, there may be other additional data tracks that are used for clean individual reflection detection.

Figure 11:
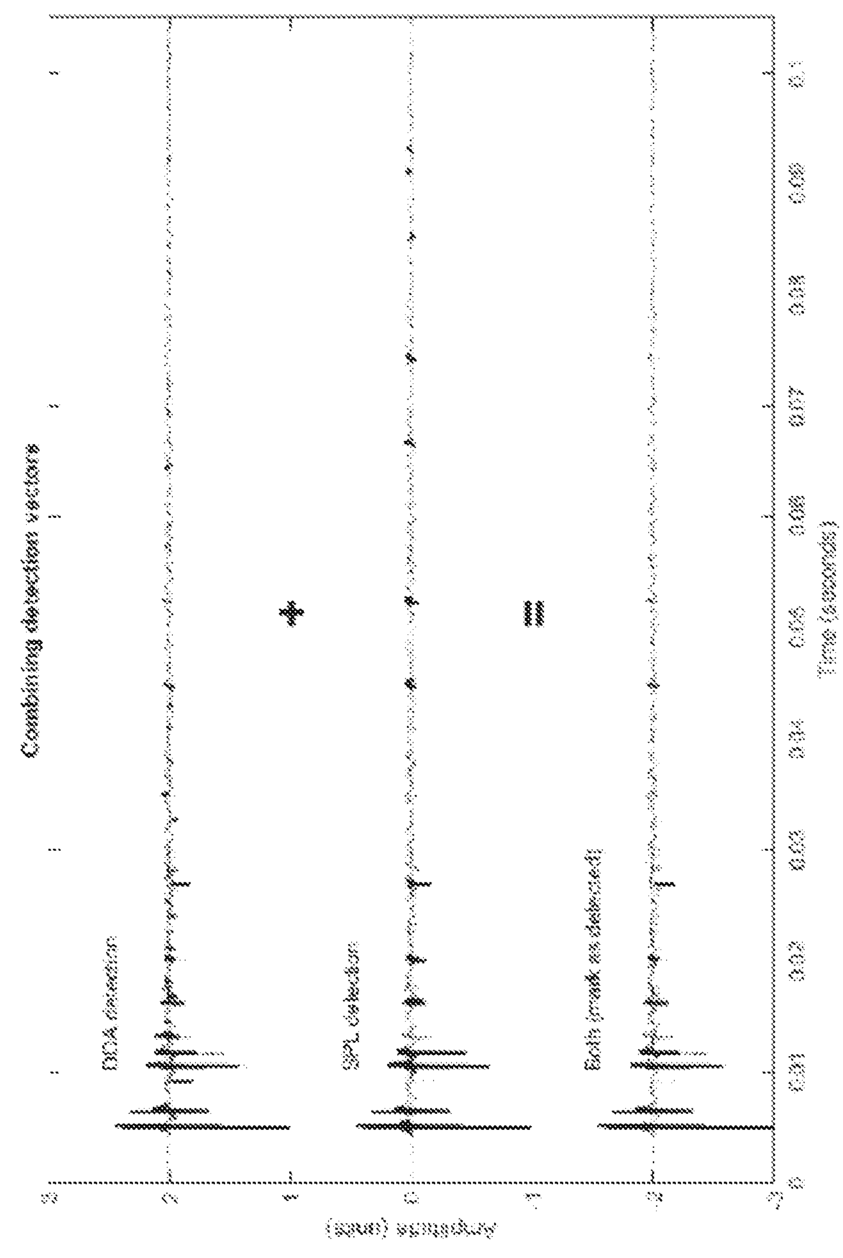
FIG. 11 shows example combinations of direction of arrival and sound level weight vectors.

An example combination of the DOA and sound level tracks is shown in FIG. 11.

The individual reflection extractor may extract any detected clean individual reflections.

Figure 12:
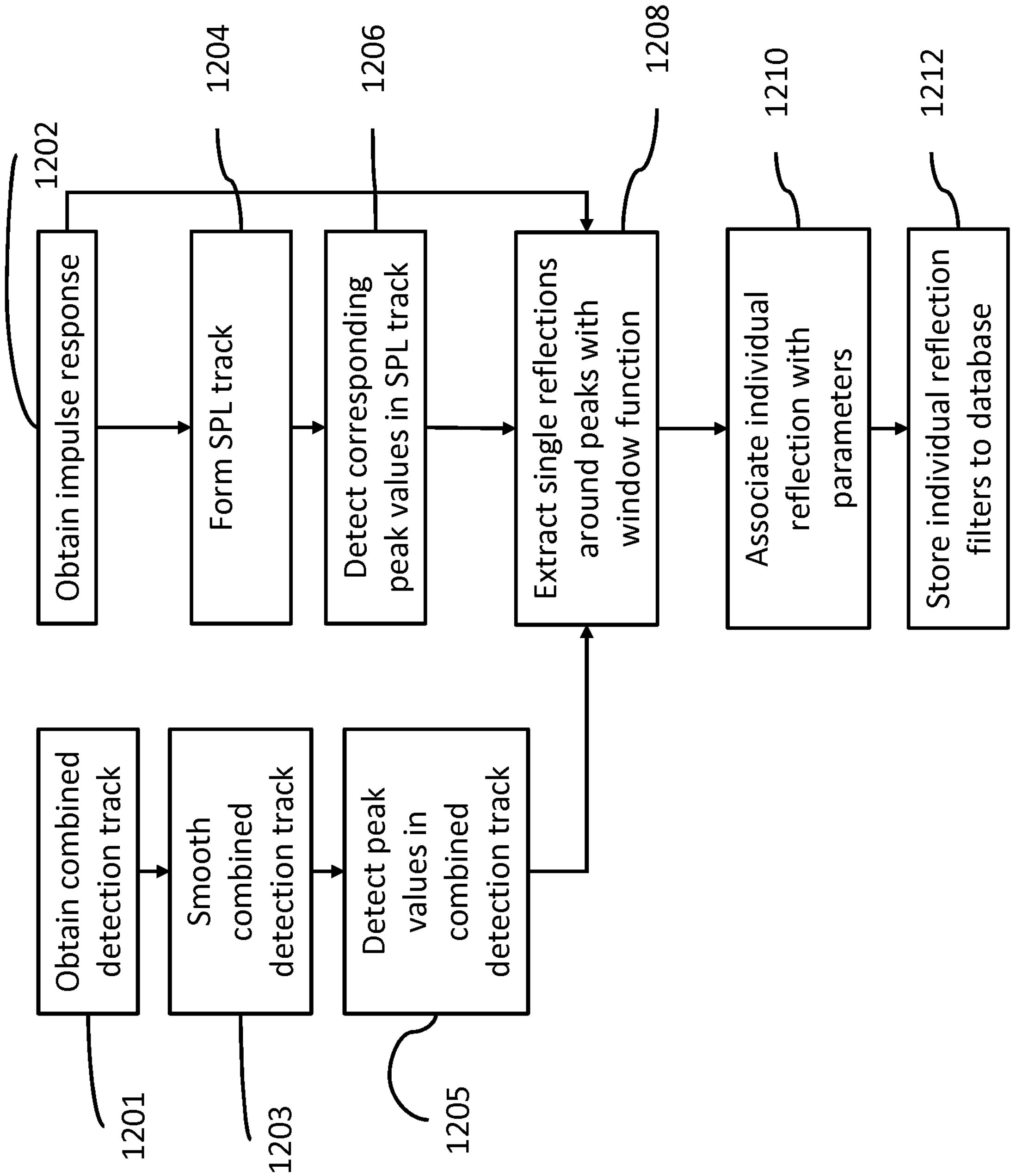
FIG. 12 shows a flow diagram of the operations of individual reflection extraction and database storage according to some embodiments.

With respect to FIG. 12 is shown the extraction of the individual reflection operations according to some embodiments.

The combined detection track is obtained as shown in FIG. 12 by step 1201. Then the obtained detection track is smoothed with a suitable smoothing window. An example smoothing window is a 1 ms long window with a short (e.g., 32 samples) gaussian fade in and fade out, for the sampling rate of 192 kHz.

The smoothing of the detection track is shown in FIG. 12 by step 1203.

Peak values of the smoothed combined detection track are selected as shown in FIG. 12 by step 1205.

Furthermore the impulse response has been obtained as shown in FIG. 12 by step 1202, and the SPL detection track formed as shown in FIG. 12 by step 1204.

The same peaks are detected in a smoothed (e.g., smoothed with 128-sample Gaussian window) SPL of the original impulse response. Peaks of the detection signal are then matched to the peaks of the SPL signal, i.e., SPL time indices are used for the extraction as shown in FIG. 12 by step 1206.

Figure 13:
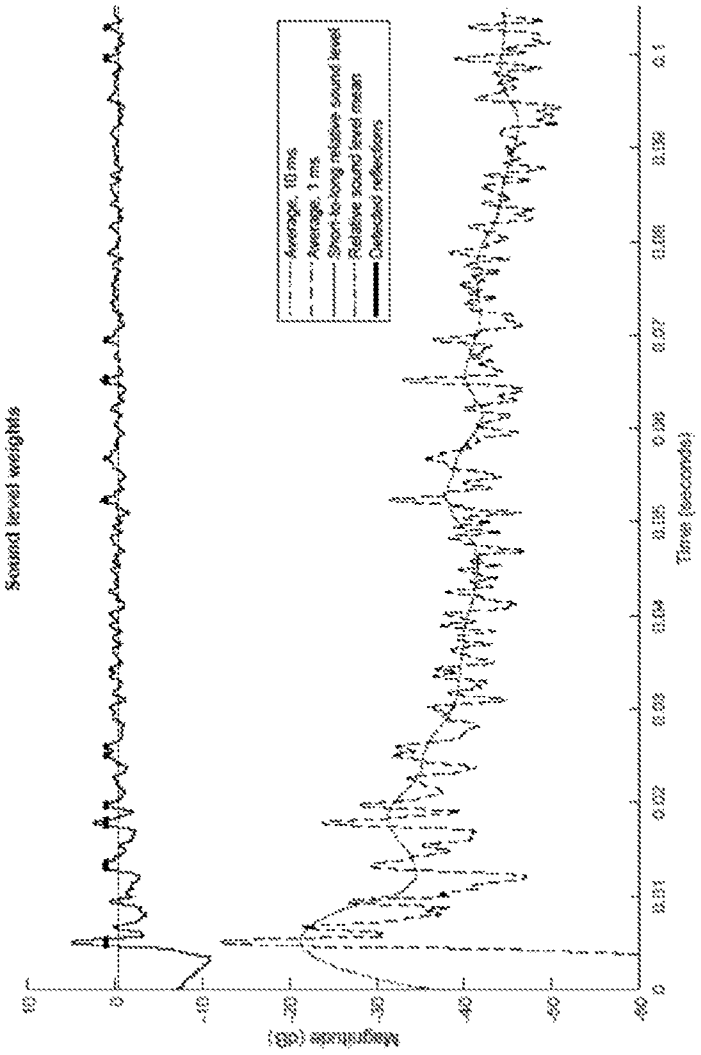
FIG. 13 shows example sound level peak matching for individual reflection detections.

The matching can for example be shown in the graph as shown in FIG. 13.

Figure 14:
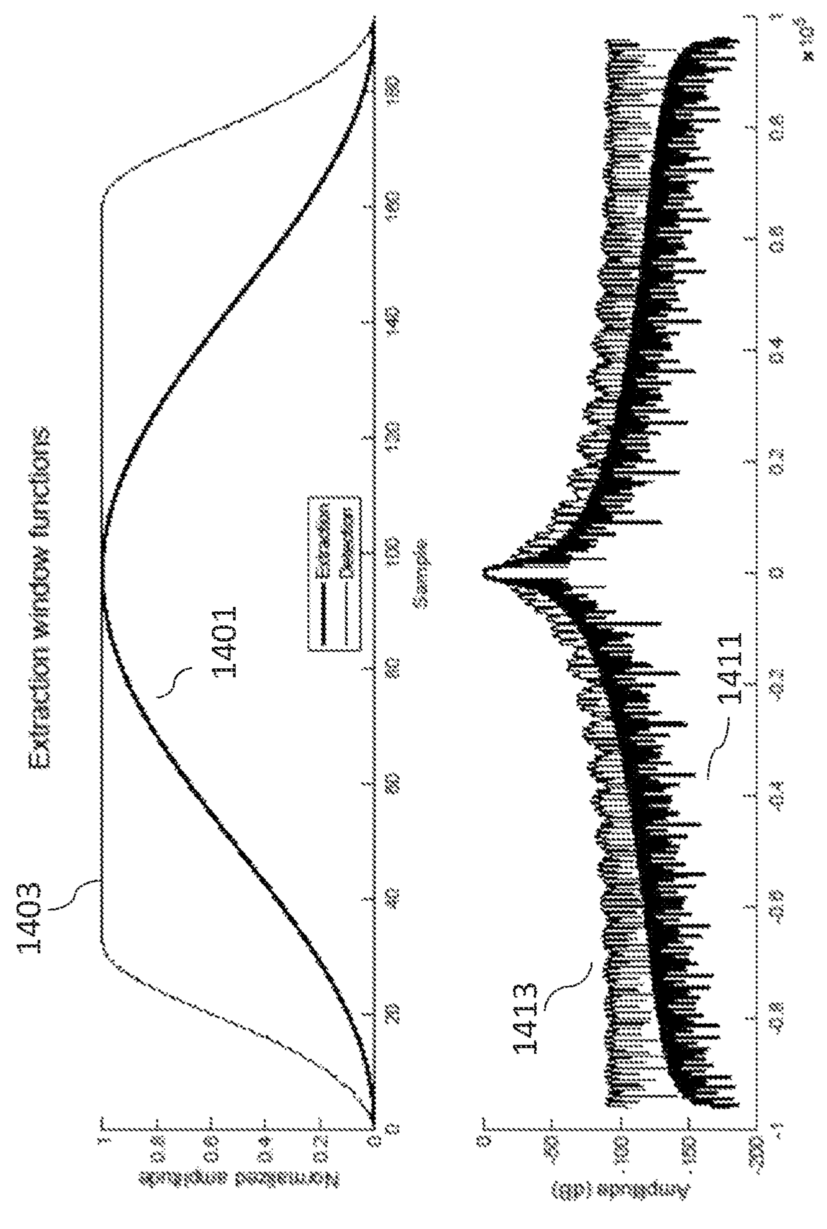
FIG. 14 shows example extraction and detection window functions.
Figure 15:
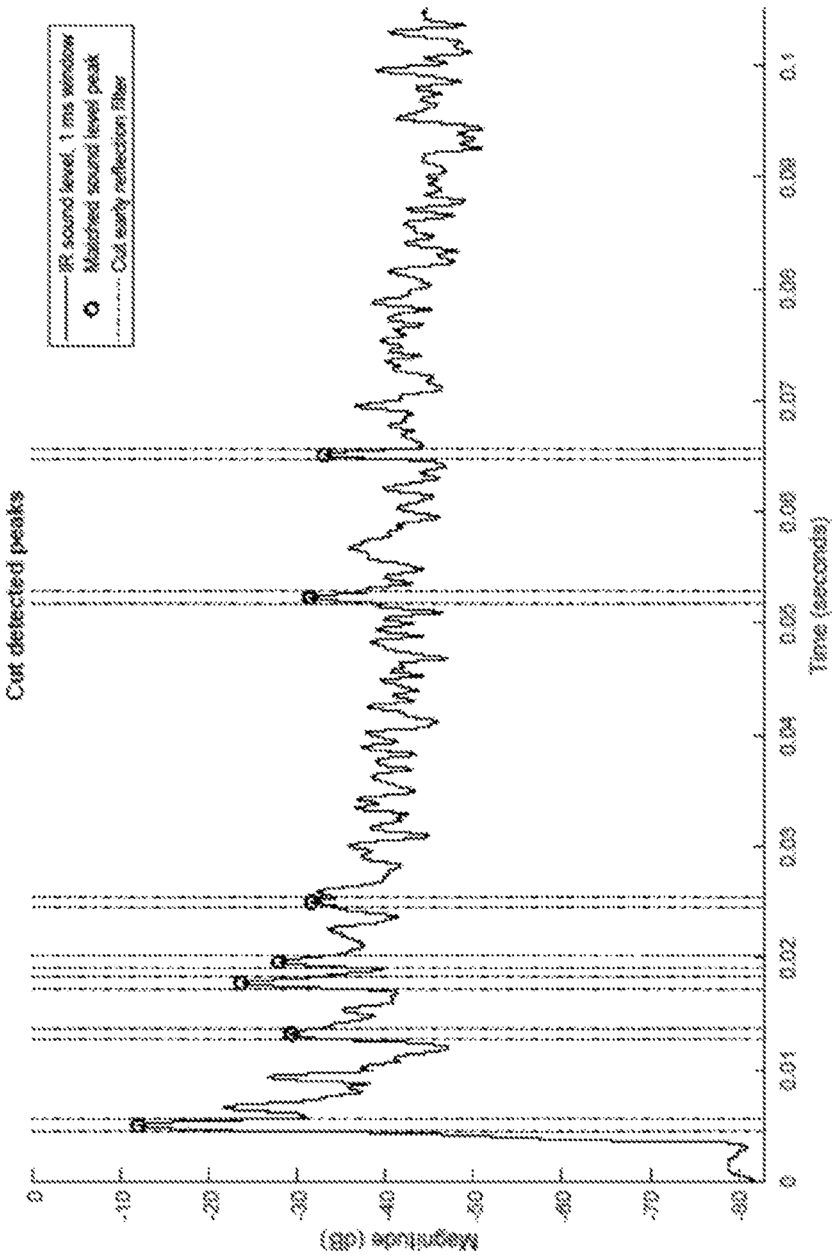
FIG. 15 shows example individual reflection filter cut lines on the impulse response.

The clean individual reflections can then be extracted based on matched peak time indices by applying a window function around this peak time index. This window function has a length such that it fits the assumed duration of an individual reflection. An example of a suitable window for this case is a 192-sample Hann window that is centred at the matched peak time index, for the sampling rate of 192 kHz as shown in FIG. 14, which shows detection window function 1401 (and filter 1411) and extraction window function 1403 (and filter 1413). Furthermore with respect to FIG. 15 is shown an example operation of extracting the individual reflections.

The extraction of individual reflections around the peaks using the window function is shown in FIG. 12 by step 1208.

Having extracted the individual reflections then the information can be passed to the individual reflection classifier 609. The individual reflection classifier 609 can be configured to associate the clean reflections with properties (such as material type and/or octave band absorption coefficients) that allow their selection for use in the rendering based on the room simulation metadata. In some embodiments the classifier 609 can be implemented as part of the measurement process (for example that a certain direction corresponds to a certain reflection surface in the measurement room with a known material) or automatically by, for example, matching the spectral attenuation properties (octave band magnitude spectrum) of the reflection to a known database of materials and their reflection properties (octave band absorption coefficients).

In some embodiments, there may be additional parameters that the reflection may be associated with. Such parameter may include (but are not limited to), for example: relative time moment of the detected event in the original impulse response, angle of incidence of reflection.

The association of the reflections with parameters is shown in FIG. 7 by step 711 and in FIG. 12 by step 1210.

In some embodiments there may be database former 611. The database former can construct the database of individual reflections and associated parameters. Once the database has been constructed, it can be stored in any suitable way or sent to renderer. The operation of storing the reflections is shown in FIG. 7 by step 713 and in FIG. 12 by step 1212.

Figure 16A:
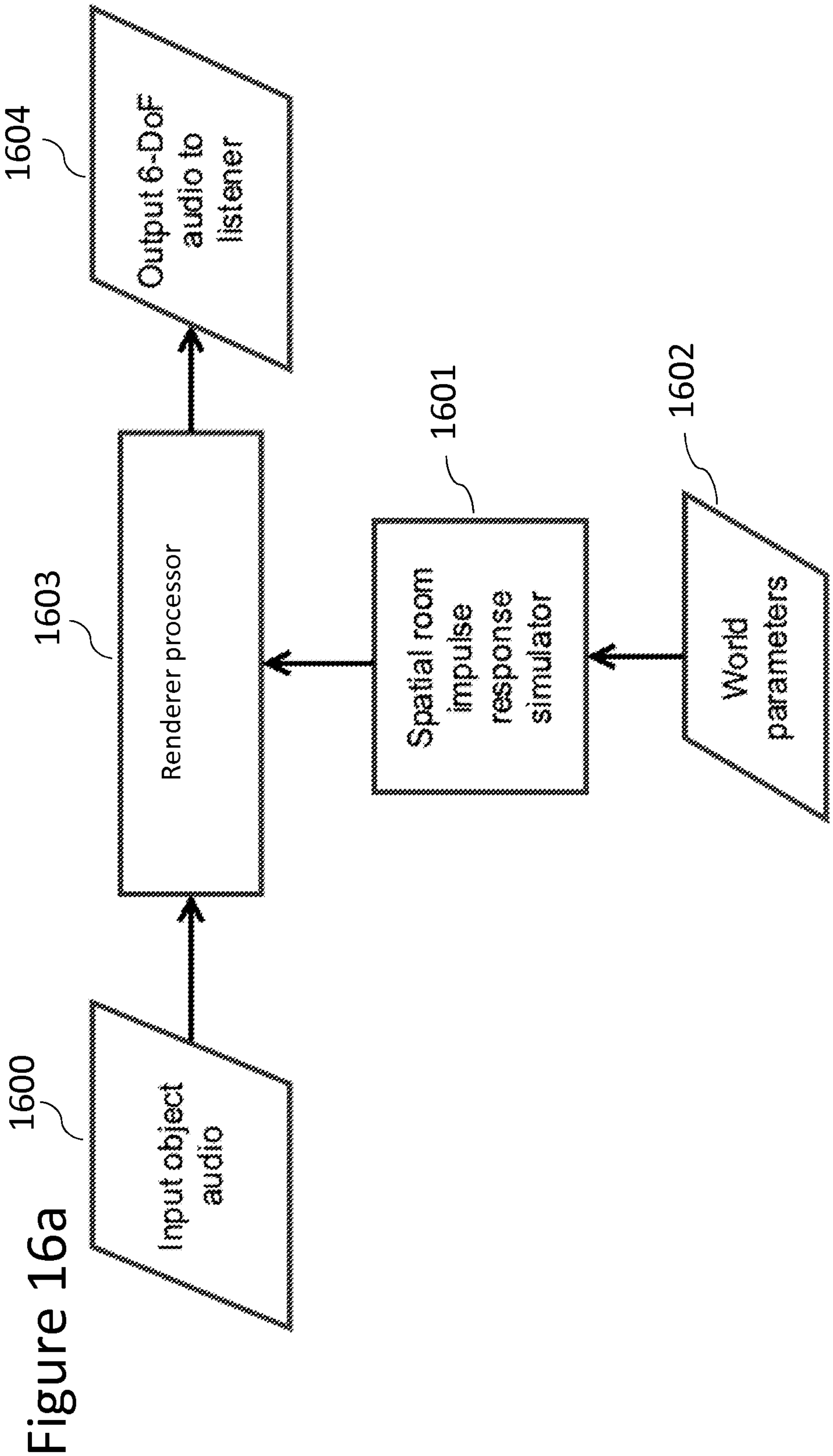
FIG. 16*a* shows an example 6-DoF Renderer apparatus.

An example renderer is shown with respect to FIG. 16*a*. The example renderer for 6 DoF spatial audio signals comprises an object audio input 1600 configured to receive the audio object audio signals. The object audio input 1600 may be understood in some embodiments to be an example of the audio data 120 as shown in FIG. 1. Furthermore the renderer comprises a world parameter input 1602. The world parameter input 1602 may in some embodiments be considered to be an example of audio metadata and control data 124 and the user input datastream 134 as shown in FIG. 1.

These 'world' parameters can in some embodiments include at least:

Listener (user) position and orientation;

Audio object/source positions and orientations; and

Room description or reverberation parameters.

These parameters can be obtained from the audio bitstream and/or the virtual reality engine as described earlier. In a MPEG-I rendering systems such as described in the embodiments above, audio object/source positions and orientations along with the room description and reverberation parameters can arrive in the audio bitstream and the listener position and orientation arrive from the a user input or virtual reality engine defining the user/listener. These parameters can in some embodiments be periodically updated (either because of user movement data arriving from the virtual reality engine or bitstream provided updates for sound source positions).

In some embodiments the renderer comprises a spatial room impulse response simulator 1601 which is configured to receive the world parameters from the world parameter input 1602. In some embodiments the updates of the world parameters can be configured to invoke the spatial room impulse response simulator 1601 to create a new response. This response is created by running the simulation again. This simulation can be any suitable acoustic modelling operation to generate a spatial room impulse response which can be passed to the renderer processor 1603.

The renderer can comprise a renderer processor 1603 configured to receive the audio signals from the object audio input 1600 and the spatial room impulse response from the spatial room impulse response simulator and renders the output with the provided spatial room impulse response. When this spatial room impulse response is updated through time based on the world parameters, the result may be full interactive 6-DoF audio rendering of the scene to the user via the 6-DoF audio output 1604.

The renderer processor 1603 is an example which shows direct rendering with the impulse response. In some embodiments, for example in real-time situations other rendering methods may be employed. In these embodiments the rendering is implemented with a spatial room impulse response. A spatial impulse response is effectively a monophonic impulse response (direct sound followed by a series of unique reflections and their superpositions) which has a defined direction for each time sample (i.e., direction for each reflection). This can be rendered to loudspeakers, for example, by creating a separate FIR-filter for each loudspeaker channel by creating loudspeaker panning gains (using, e.g., VBAP) for each time sample and multiplying the monophonic impulse response with the created panning gains. The resulting channel-based FIR-filters (i.e., channel-based impulse responses) can then be convolved with monophonic object audio to produce the spatialized reverberated output.

Figure 18A:
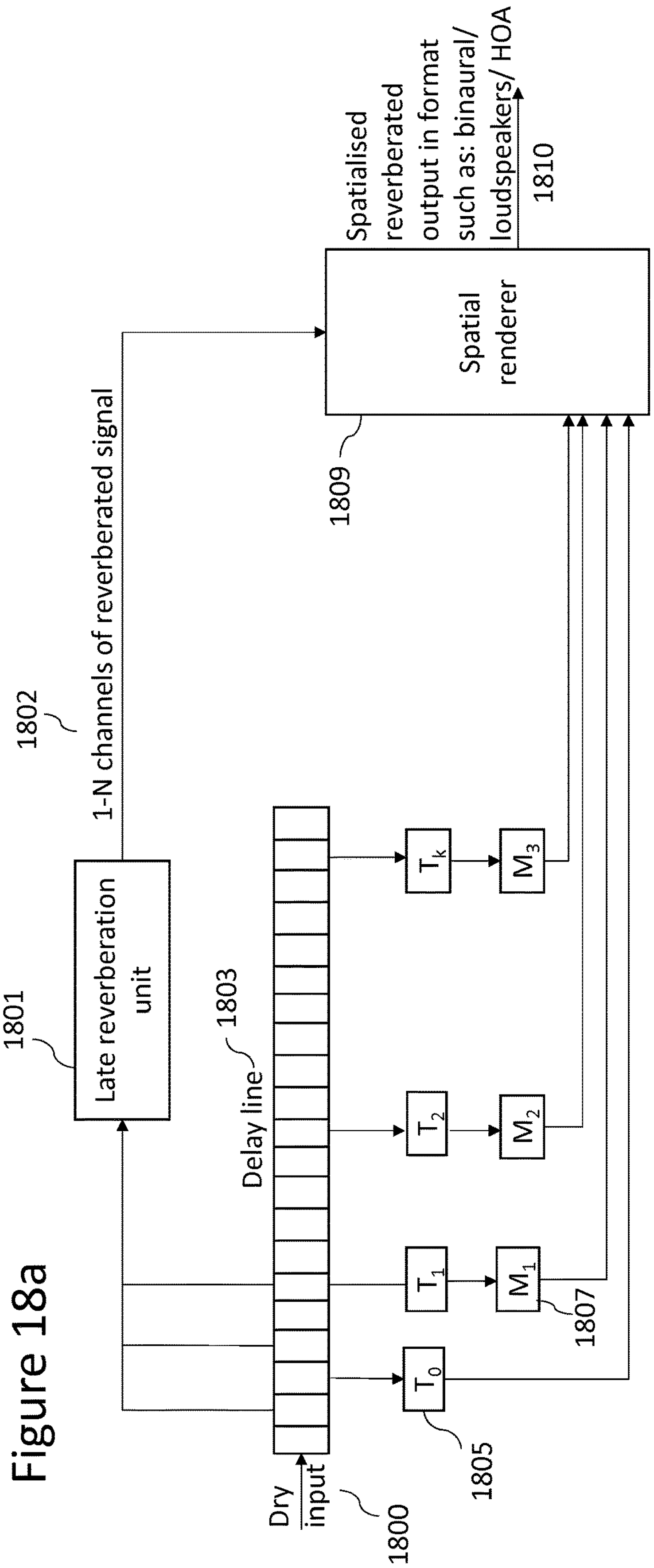
FIG. 18*a* shows an example renderer apparatus according to some embodiments.

An example renderer furthermore is shown with respect to FIG. 18*a*. FIG. 18*a* shows the dry input 1800 which is input to the delay line 1803. The dry input 1800 is the 'direct' audio signal, in other words an audio signal where there are not reflections. This description corresponds to a single source (e.g., one audio object or loudspeaker channel) but it is trivial to extend this to multiple sources or other source types by duplicating either the whole system or relevant parts (to optimize computational effort).

The process starts by obtaining the (usually) acoustically dry input signal (such as object audio) that is input into a delay line. This delay line is usually long (e.g., multiple seconds) and can be implemented, e.g., with a circular buffer. This usually has exactly one input and multiple (at least one) outputs with different (or same) delays. These outputs correspond to direct travel path of sound, different early reflection paths, and outputs suitable for inserting to late reverberation generator. Simulation metadata controls the time delay applied for each output. For example, a 3.4 metre distance from the source to listener would mean approximately 10 ms delay for the direct sound path and with an example rendering sampling rate of 48 kHz this would mean that the output from the delay line for the direct path signal would come approximately 480 samples delayed in time compared to the input of the delay line. Similarly, early reflections will receive correct delay value.

Direct path, early reflections, and late reverberation paths will then receive their own processing as separate (or possibly combined in parts for computational efficiency).

For example the renderer is configured to extract a direct path audio signal from the delay line 1803 and apply a filter $T_0$ 1805 that contains such room simulation dependent effects such as: distance-based attenuation, air absorption, and source directivity. This filter can be a single filter or multiple cascaded modifications.

After the extracted direct audio signal is filtered then the filtered audio signal can be passed to a spatial renderer 1809 where the direct path audio signal component can be spatialized into the direction corresponding to source positions in relation to the listener based on the room simulation data and the listener position and orientation.

Such spatialization may depend on the target format of the system and can be, e.g., vector-base amplitude panning (VBAP), binaural panning, or HOA-panning. Finally, the spatialized filtered direct signal can be combined with any further reflection audio signals (as described hereafter) and a suitable spatialized output signal generated 1810. In this example the spatialization, combining and rendering operations can be combined into one unit but it would be understood that these operations may be separated into separate units.

In the following example the renderer is configured to generate and process early reflection paths separately for each early reflection sound propagation path in the simulation. In some embodiments these may be optimized or grouped into fewer paths. The delay of each early reflection comes from the room simulation metadata (in a manner similar to the extraction of the direct path audio signal).

Each of the extracted early reflection audio signals are configured to be passed to a filter $T_k$. The filter $T_k$ is similar to the direct path filter $T_0$ and is configured to apply similar room simulation effects.

Additionally in some embodiments the filtered extracted early reflection audio signals are filtered by the application of individual reflection filters $M_1$ to $M_k$ 1807. Each of the individual reflection filters are those obtained by the embodiments described above. This significantly enhances the perceptual quality of the rendered reflection. In some embodiments the individual reflection filter is implemented as a finite impulse response (FIR) filter (i.e., filtering with the stored reflection impulse response).

The early reflection paths can then be spatialized, combined (with the direct and late reverberation elements) and rendered to form the rendered audio output 1810.

The rendered early reflections may in some embodiments contain different orders of reflections. The order of the reflection defines the number of surfaces the sound has reflected from before arriving to the listener. As each surface reflection requires a reflection filter, this means that in some embodiments there may be a cascade of multiple individual reflection filters for higher-order reflections. In some embodiments the multiple order reflections are implemented not as a cascade of filters but by the encoder configured to design different filters for all possible combinations of materials and then signal or indicate which of the designed filters or material combinations form or correspond to the combined filters.

The late (reverberation) part, can in some embodiments be rendered in a late reverberation unit 1801 which may be implemented as a Feedback Delay Network (FDN)-reverberator.

Figure 18B:
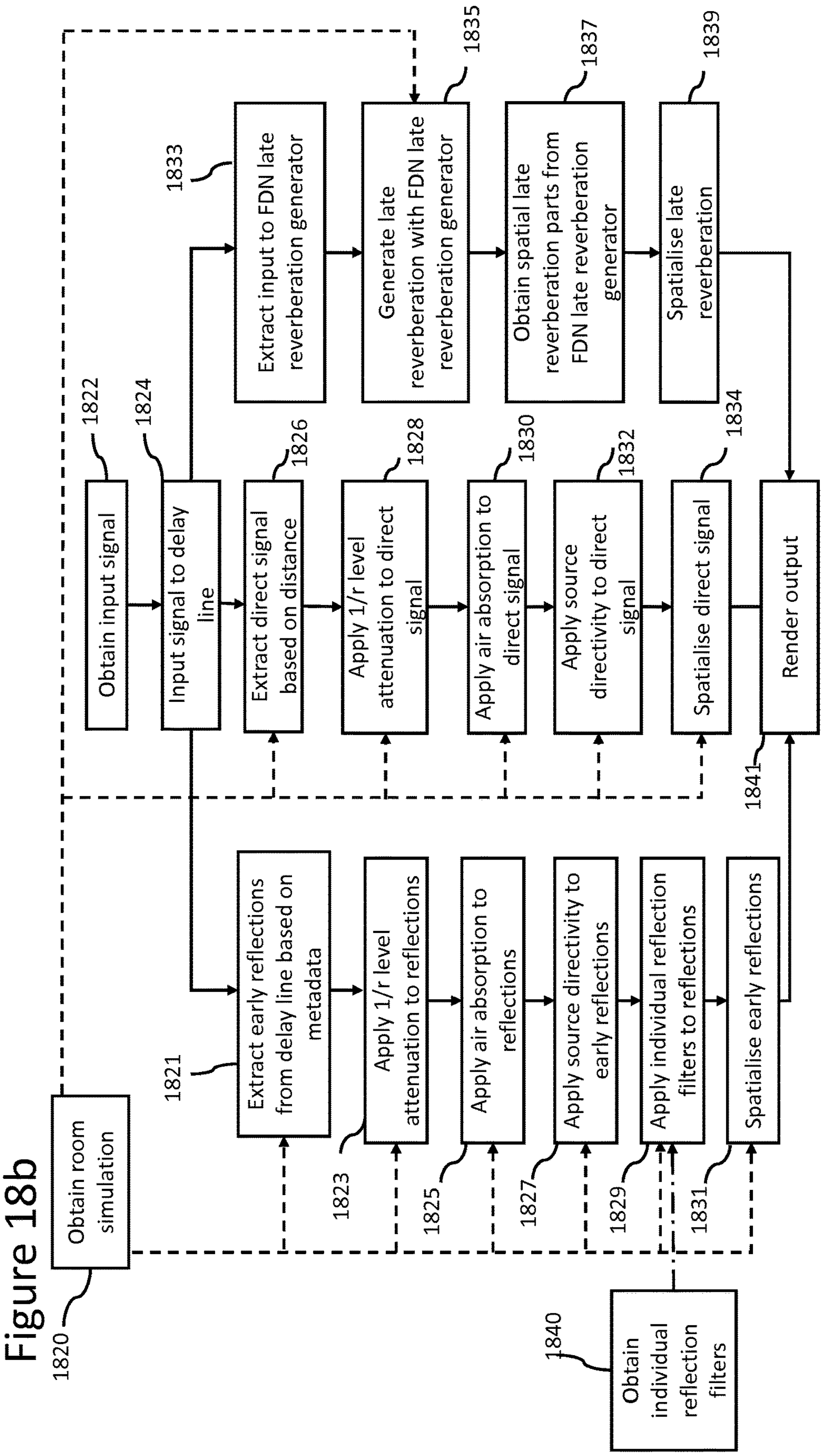
FIG. 18*b* shows a flow diagram of the operation of the example renderer apparatus according to some embodiments.
Figure 18C:
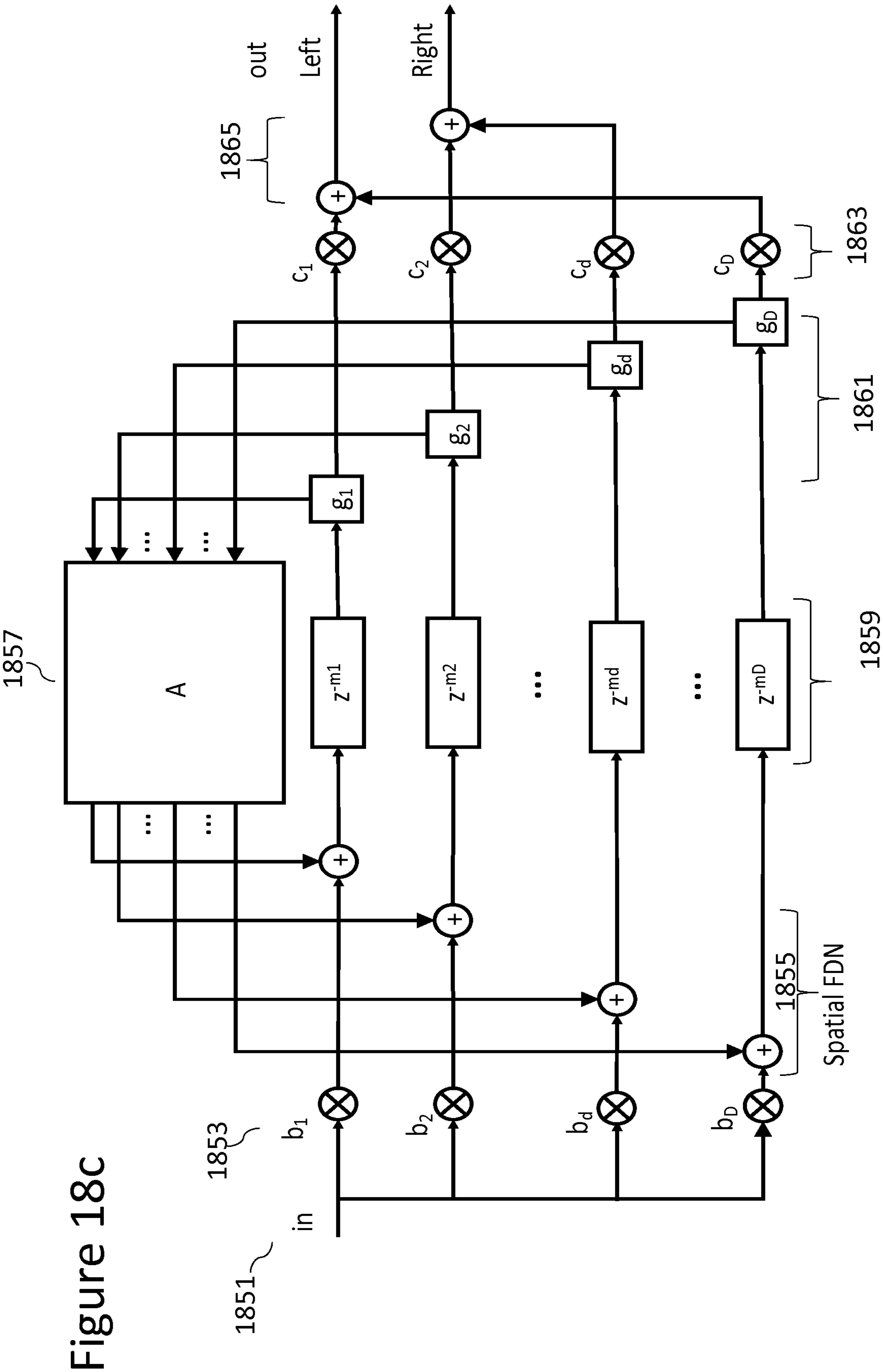
FIG. 18*c* shows an example feedback delay network late reverberation generator according to some embodiments.

An example of a FDN reverberator is shown in FIG. 18*c*. This reverberator uses a network of delays 1859, feedback elements (shown as gains 1861, 1857 and combiners 1855) and output combiners 1865) to generate a very dense impulse response for the late part. Input samples are input to the reverberator to produce the late reverberation audio signal component which can then be output to the late, individual reflection and direct audio signal combiner.

The FDN reverberator comprises multiple recirculating delay lines. The unitary matrix A 1857 is used to control the recirculation in the network. Attenuation filters 1861 which may be implemented in some embodiments as low-order IIR filters can facilitate controlling the energy decay rate at different frequencies. The filters 1861 are designed such that they attenuate the desired amount in decibels at each pulse pass through the delay line and such that the desired RT60 time is obtained.

In some embodiments the late part can be spatialized. In some embodiments the late part is processed such that it is perceived to come from “no specific direction”, i.e., it is completely diffuse. The FIG. 18*c* shows an example of FDN reverberator that actually applies to two-channel output but may be expanded to apply to more complex outputs (there could be more outputs from the FDN).

In some embodiments the late part is not spatialized. In other words in some embodiments the late part is configured so that the uncorrelated outputs of the FDN are directly routed to the spatial outputs (binaural or loudspeaker channels). When two uncorrelated outputs from an FDN are produced they could directly be routed to the headphone outputs, or correspondingly N uncorrelated outputs to N loudspeakers (these N outputs can be N delay lines of the FDN). If there are fewer delay lines than number of output loudspeakers then in some embodiments it can be configured to route different delay line outputs to different output channels (selected evenly from the set of outputs) or then create additional output channels for the FDN via decorrelation. In some embodiments the outputs of the FDN can also be allocated or given spatial positions and then spatialized. In some embodiments the FDN outputs can be spatialized at fixed spatial positions for binaural rendering.

With respect to FIG. 18*b* an example flow diagram of the operation of the renderer according to some embodiments is shown.

The room simulation model is obtained as shown in FIG. 18*b* by step 1820.

The input signal is obtained as shown in FIG. 18*b* by step 1822.

Furthermore the individual reflection filters are obtained as shown in FIG. 18*b* by step 1840.

The input signal is applied to the delay line as shown in FIG. 18*b* by step 1824.

The early reflections are extracted from the delay line based on the metadata as shown in FIG. 18*b* by step 1821.

A 1/r level attenuation is applied to the early reflections as shown in FIG. 18*b* by step 1823.

Air absorption is then applied to the early reflections as shown in FIG. 18*b* by step 1825.

Source directivity is then applied to the early reflections as shown in FIG. 18*b* by step 1827.

The individual reflection filter is applied to the early reflections as shown in FIG. 18 by step 1829.

The early reflections are then spatialized as shown in FIG. 18*b* by step 1831.

The direct signal is extracted from the delay line based on the distance as shown in FIG. 18*b* by step 1826.

A 1/r level attenuation is applied to the direct signal as shown in FIG. 18*b* by step 1828.

Air absorption is then applied to the direct signal as shown in FIG. 18*b* by step 1830.

Source directivity is then applied to the direct signal as shown in FIG. 18*b* by step 1832.

The direct signal is then spatialized as shown in FIG. 18*b* by step 1834.

The input is further passed to the FDN late reverberation generator as shown in FIG. 18*b* by step 1833.

The FDN then is used to generate the late reverberation as shown in FIG. 18*b* by step 1835.

The spatial late reverberation parts are then obtained from the FDN as shown in FIG. 18*b* by step 1837.

The late reverberation parts are then spatialized as shown in FIG. 18*b* by step 1839.

The parts are then combined to generate the render output as shown in FIG. 18 by step 1841.

Figure 16B:
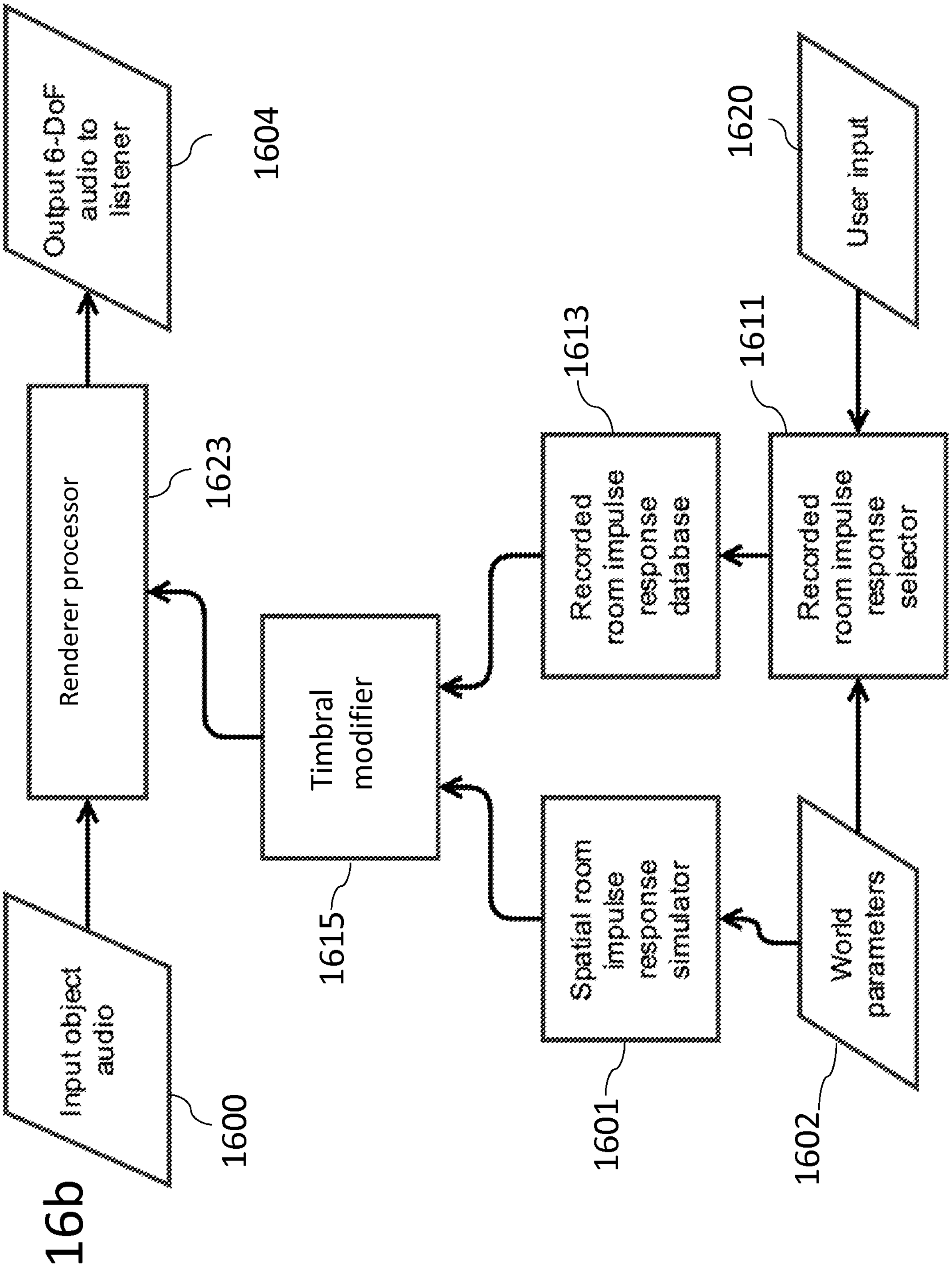
FIG. 16*b* shows an example 6-DoF Renderer apparatus with timbral modification according to some embodiments.

FIG. 16*b* shows a further example renderer system. The further example renderer system is similar to the renderer as shown in FIG. 16*a* but includes a timbral modification-process. The example renderer for 6 DoF spatial audio signals comprises the object audio input 1600 configured to receive the audio object audio signals. The object audio input 1600 may be understood in some embodiments to be an example of the audio data 120 as shown in FIG. 1 as described earlier.

Furthermore the renderer comprises a world parameter input 1602. The world parameter input 1602 may in some embodiments be considered to be an example of audio metadata and control data 124 and the user input datastream 134 as shown in FIG. 1 as also described earlier.

The renderer comprises a spatial room impulse response simulator 1601 in a manner described above which is configured to receive the world parameters from the world parameter input 1602. This simulation can be any suitable reverberation modelling operation to generate a spatial room impulse response which can be passed to the renderer processor 1603.

In some embodiments the renderer comprises a user input 1620 which can be passed to a recorded room impulse selector 1611.

The renderer comprises a recorded room impulse response database 1613 and recorded room impulse response selector 1611. The recorded room impulse response selector 1611 is configured to receive the user input 1620 and the world parameters and select a recorded room impulse response from the recorded room impulse response database 1613.

In some embodiments this is achieved by the provided reverberation time $T_{60}$ being used to find closest match for the simulated room from the database. The reverberation time can be indicated for a set of frequency bands; for example octave bands. In addition, other parameters such as diffuse-to-direct ratio can be provided and used for finding the match. Alternatively, world parameters, user, or bitstream can indicate a specific definition that certain response should be used. The selected recorded room impulse response is forwarded to the timbral modifier 1615.

The renderer can comprise a timbral modifier 1615 configured to receive the spatial room impulse response simulator 1601 and selected room impulse response database 1613 outputs and implement a timbre modification algorithm together with the simulated room impulse response. In some embodiments part of the above process can be implemented on an encoder. In particular, in the MPEG-I scenario for virtual reality audio rendering the encoder device can select one or more recorded room impulse responses to be used for rendering an acoustic scene. These selected impulse responses are then sent in the audio bitstream to the renderer device.

In some embodiments the timbral correction filters can be generated or created in the encoder and signalled to the renderer in a manner similar as described with respect to the individual reflection filters. In these embodiments the bitstream is configured to store the created timbral correction filter coefficients for certain listener and/or sound source positions (and not the recorded impulse responses). The encoder is then configured to design the timbral correction filters based on the recorded impulse responses in the encoder.

The renderer can in some embodiments comprise a renderer processor 1623 configured to receive the audio signals from the object audio input 1600 and the combined spatial room impulse response from timbral modifier 1615 and render the output with the provided combined spatial room impulse response. The combined spatial room impulse response can in some embodiments be updated through time (for example based on the world parameters). The result of the render processor 1623 can then be passed to the audio output 1604.

Figure 16C:
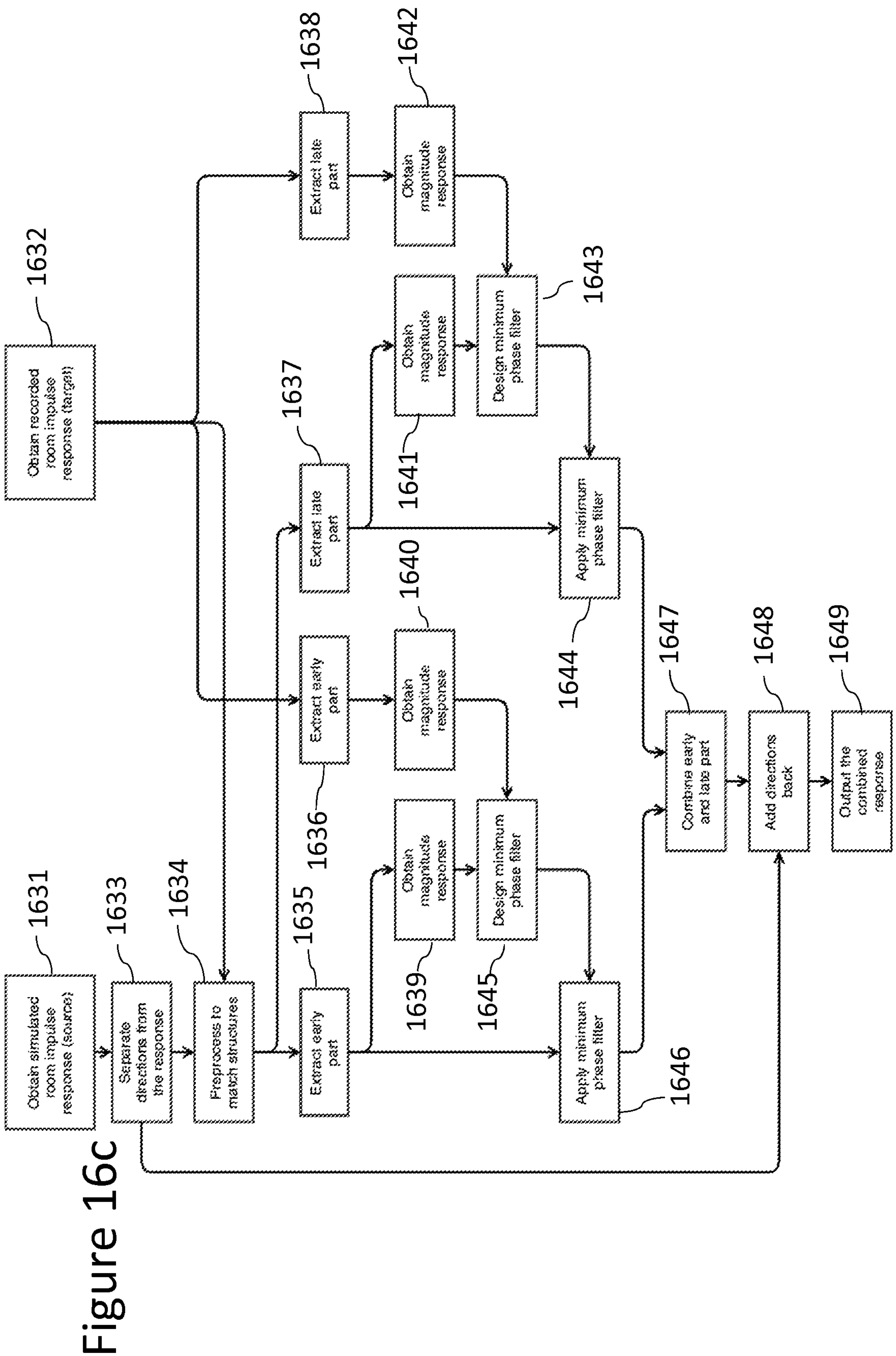
FIG. 16*c* shows a flow diagram of the operations of timbral modification according to some embodiments.

FIG. 16*c* shows a flow diagram of the operation of the timbral modifier within the renderer as shown in FIG. 16*b*. It should be noted that the process effectively contains two parallel processes where similar processing is performed for the early part (direct sound and early reflections) and the late part (late reverberation) separately. This separation allows the use of different algorithms and parameters for the early and late part to make the timbral modification method more accurate and/or efficient.

The simulated room impulse response (source) is obtained as shown in FIG. 16*c* by step 1631.

Furthermore the directions are separated from the response as shown in FIG. 16*c* by step 1633. The directions are separated from the simulated spatial room impulse response to obtain simulated monophonic room impulse response. In practice, directions may be a simple additional metadata track that can be passed on.

Furthermore the recorded room impulse response (target) is obtained as shown in FIG. 16*c* by step 1632.

Figure 17A:
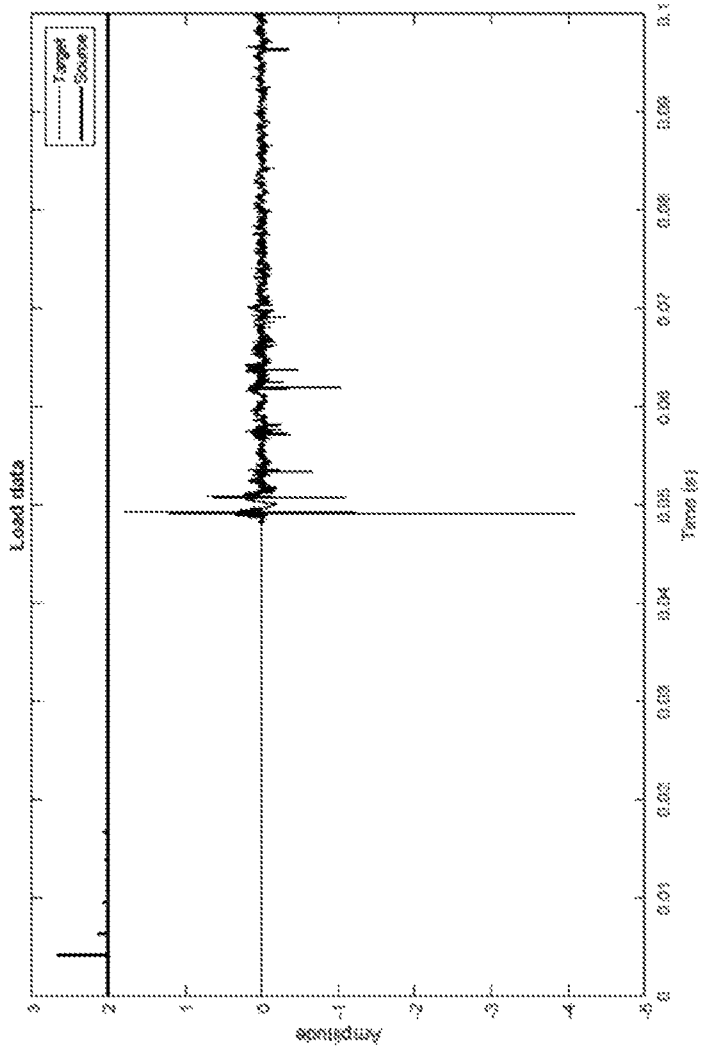
FIG. 17*a* shows example source and target impulse responses.

An example set of source and target impulse responses are shown in FIG. 17*a*.

Figure 17B:
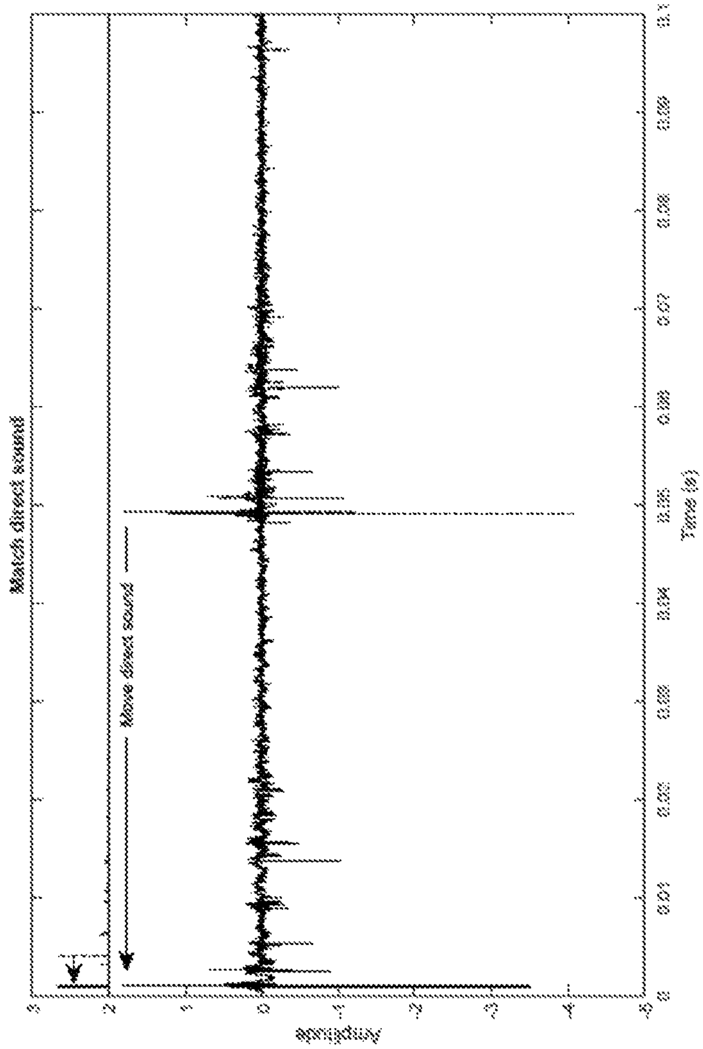
FIG. 17*b* shows example matching of the direct sound in time for the example source and target impulse responses.
Figure 17C:
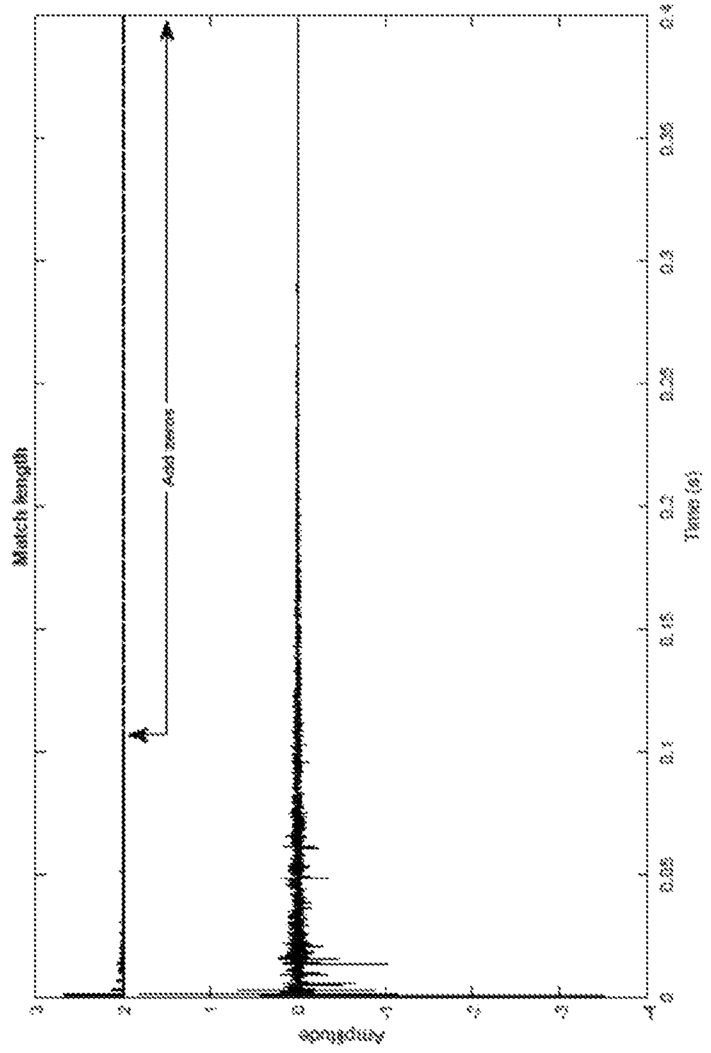
FIG. 17*c* shows example matching of the length of the example impulse responses.
Figure 17D:
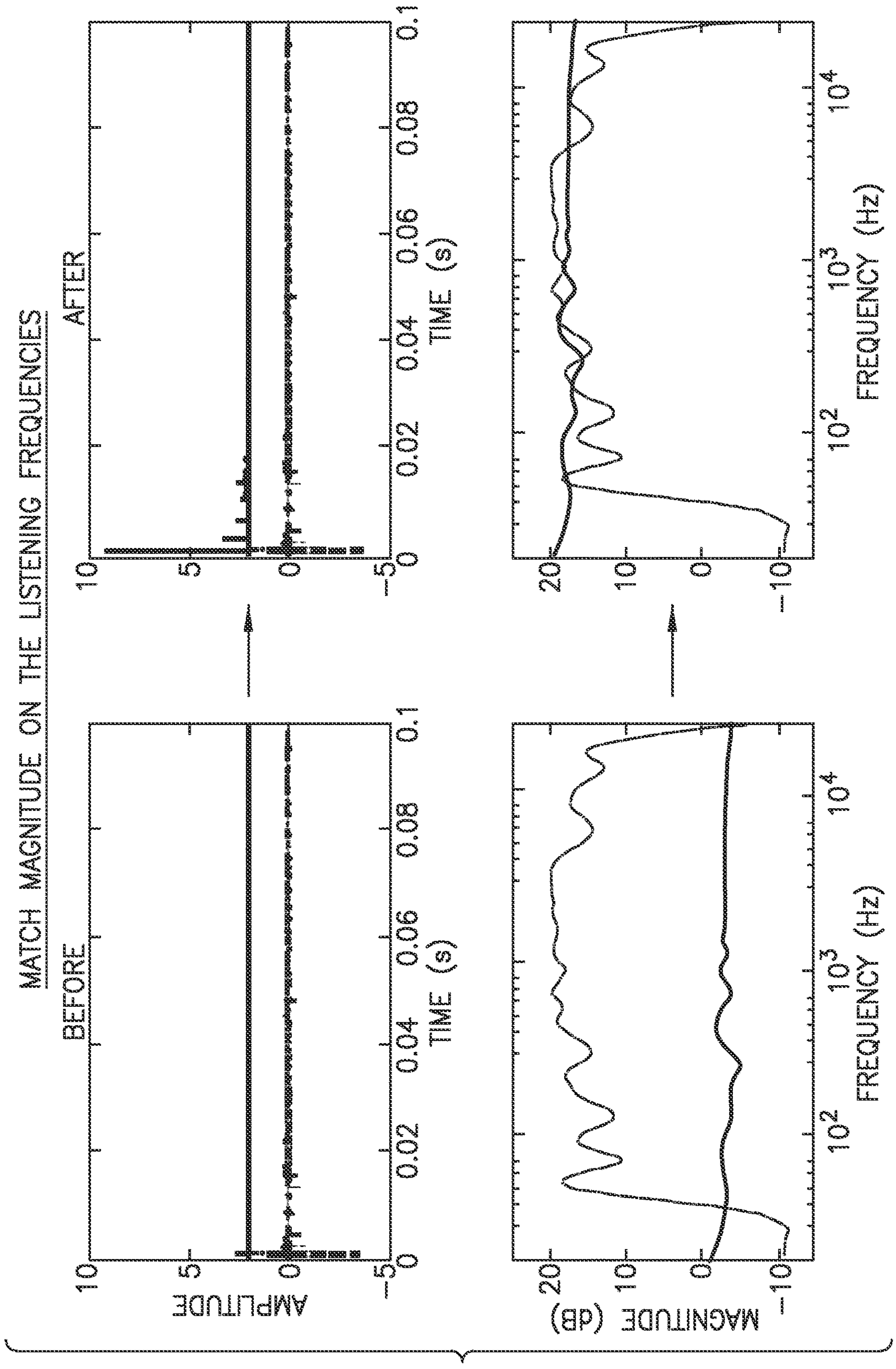
FIG. 17*d* shows example matching of the audio level.

The next step is to match the overall structure of the responses as shown in FIG. 16*c* by step 1634. This can in some embodiments be implemented by matching the sampling rates (if necessary). Furthermore the matching may be matching the direct sound in time (i.e., largest amplitude is at the same time sample). The time sample matching can be shown with respect to the move direct sound time as shown in FIG. 17*b*. Matching may furthermore be making the response equal length by adding zeroes to the end of the shorter response as shown in the FIG. 17*c*. Furthermore matching in some embodiments may be matching the audio level by making the sum of the magnitudes in frequency from 100 Hz to 10 kHz the same. This for example is shown by the example shown in FIG. 17*d*.

Figure 17E:
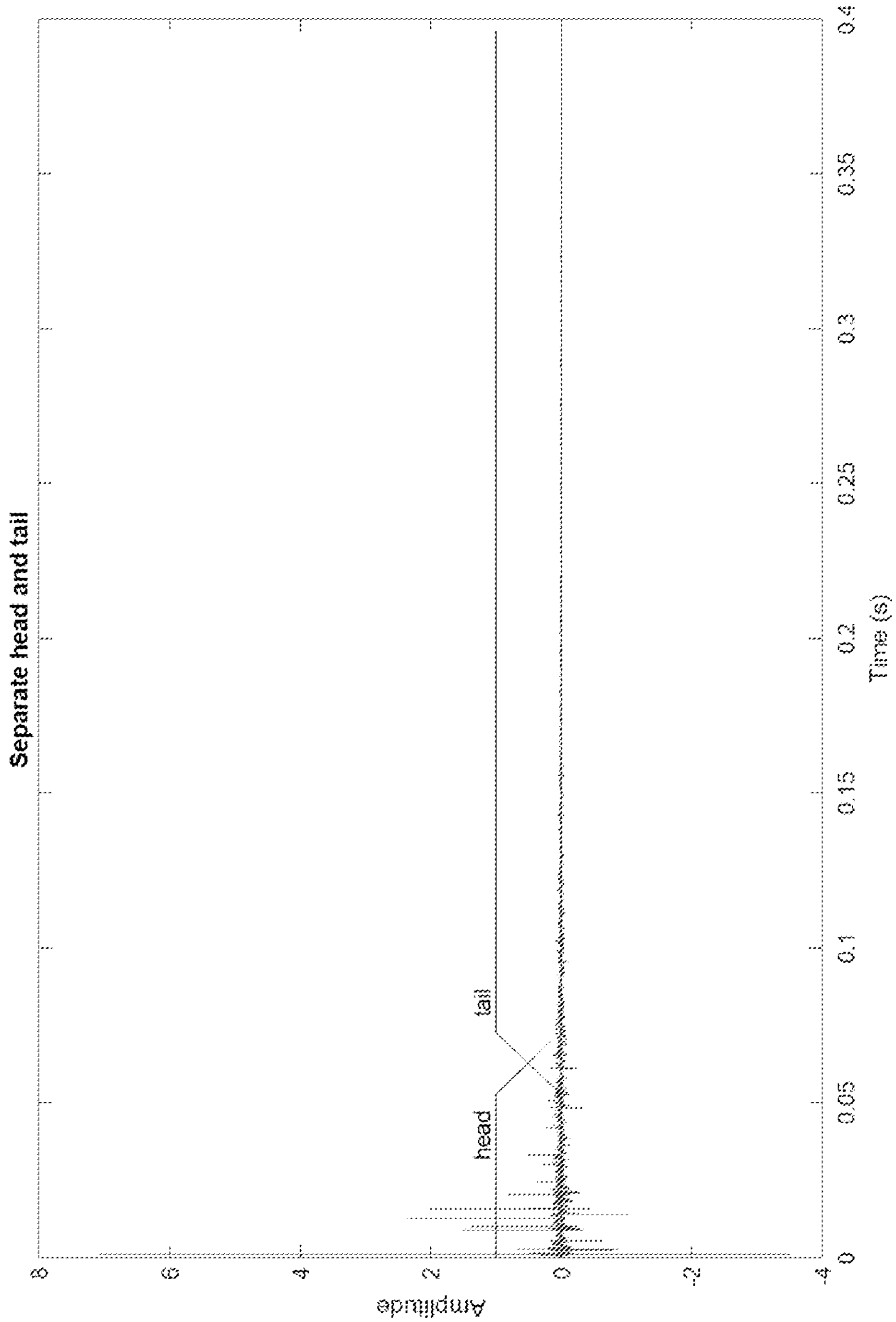
FIG. 17*e* shows example separation of the responses into individual and late parts.

Furthermore both impulse responses are separated to early and late parts as shown in FIG. 16*c* by steps 1635, 1636, 1637, and 1638. This separation is shown in FIG. 17*e* by the head and tail filters. This separation is done using the "mixing time" that defines the time moment where the late reverberation begins.

In some embodiments for simulation, the early and late parts can also be obtained separately thus skipping the separation step.

A mixing time can be determined from a response, or alternatively, this time moment can be selected, e.g., based on the length of the early part of simulation or as a fixed value per target response. In some embodiments, the mixing time can be signaled in the audio bitstream as the pre-delay time indicating the beginning of the diffuse late reverberation.

In some embodiments the separated early and late parts are converted into the frequency domain to obtain the magnitude response as shown in FIG. 16*c* by the steps 1639, 1640, 1641 and 1642. In some embodiments the magnitude response is the absolute value of a frequency response.

In some embodiments the magnitude response of the target impulse response is divided with the magnitude response of the source impulse response to obtain the timbral modification zero-phase filter as shown in FIG. 16*c* by step 1645 (for the early part) and step 1643 (for the late part). This may be represented as follows:

$$H_s = \mathcal{F}(h_s)$$

$$H_t = \mathcal{F}(h_t)$$

$$|H_p| = \frac{|H_t|}{|H_s|}$$

The source magnitude response may contain very small values that would cause large amplification in the timbral modification-filter. This can be avoided in some embodiments by limiting the amplification of the timbral modification filter to a maximum value. An example maximum value can be 4.

As the resulting timbral modification filter is zero-phase, it is not directly applicable. In some embodiments an additional step is to convert it into a corresponding minimum-phase filter $H_p$. This can be achieved, for example, by implementing the method as discussed within https://ccrma.stanford.edu/~jos/filters/Conversion_Minimum_Phase.html.

The method involves computing the cepstrum of $|H_p|$ and replacing any anticausal components with corresponding causal components. This means that the part of the cepstrum before the time zero is flipped about the time zero and added to the part of the cepstrum after the time zero. This corresponds to reflecting non-minimum phase zeros and unstable poles inside the unit circle such that spectral magnitude is preserved. The original spectral phase (zeros) is then replaced by the minimum phase corresponding to the obtained spectral magnitude.

The minimum-phase filter is then applied to the early part of the simulated impulse response (e.g., with convolution) to obtain the combined, timbrally modified, early part as shown in FIG. 16*c* by step 1646.

The minimum-phase filter is then applied to the late part of the simulated impulse response (e.g., with convolution) to obtain the combined, timbrally modified, late part as shown in FIG. 16*c* by step 1644.

This combined early part is then combined together with the combined late part to form the full combined impulse response as shown in FIG. 16*c* by step 1647.

The full combined impulse response may then be combined with the directions that were separated earlier as shown in FIG. 16*c* by step 1648. This produces the combined spatial room impulse response which is output as shown in FIG. 16*c* by step 1649 to the renderer processor to render object audio as already described above.

In some embodiments an alternative option for the timbral modification filter design is the use of a frequency-warped transform instead of a normal discrete Fourier transform (or similar evenly-sampled transform). These embodiments use a specific filterbank or otherwise modified transform to obtain uneven frequency resolution. For example this is described in Harma, Karjalainen, Savioja, Valimaki, Laine, Huopaniemi, "Frequency-Warped Signal Processing for Audio Applications", Journal of the Audio Engineering Society, Vol. 48, no. 11, pp. 1011-1031. For audio applications, this is usually used to achieve better match to human hearing by warping the frequency scale to follow, e.g., Bark or equivalent rectangular bandwidth (ERB) scale. Thus for example this allows the resulting timbral modification-filter to produce a closer match on the low frequencies by sacrificing match accuracy on the high frequencies. As low frequencies often have more energy and perceptual meaning to a listener, this modification may improve the perceptual match of the combined response to the target. Furthermore, this allows reducing the order of the filter which directly affects the computational complexity as well.

In some embodiments it is also possible to directly replace the magnitude response of the source impulse response with the magnitude response of the target impulse response. This process theoretically perfectly achieves the intention of modifying the timbre of the source impulse response towards the target impulse response, however this process is non-causal and may produce "ringing" (mirroring of impulse response time components) in the impulse response at the end of the response. However, this can be suppressed by removing these extra impulses. The process can in some embodiments implement the following operations:

Obtain frequency responses of the source and target impulse responses (i.e., convert to the frequency domain) and match their overall structure as described in the above embodiments;

Replace the source magnitude response with the target magnitude response to produce a combined response;

Convert the combined response to the time domain;

Remove undesired components from the end of the combined response by setting them to zero (in practice, all samples after the original impulse response length).

The resulting combined impulse response is closer to the target response but does not achieve equally large effect as the method described in the earlier embodiments. However, these embodiments can implement an iteratively applied operation to get a better and better match to the target response. Otherwise in some embodiments these embodiments can be used in a manner similar to the earlier methods. In other words to replace the filter design part.

In some embodiments a convolution with a full spatial room impulse response is not performed. This is due to inherent computational complexity in rendering with a long impulse response using convolution (even with fast convolution techniques). Thus in some embodiments the rendering processor is configured to render the early and late parts separately (in a manner similar to the timbral modification as described in the earlier embodiments) and renders them separately using different methods. It is also possible to further separate the direct path from the early part if necessary.

Figure 16D:
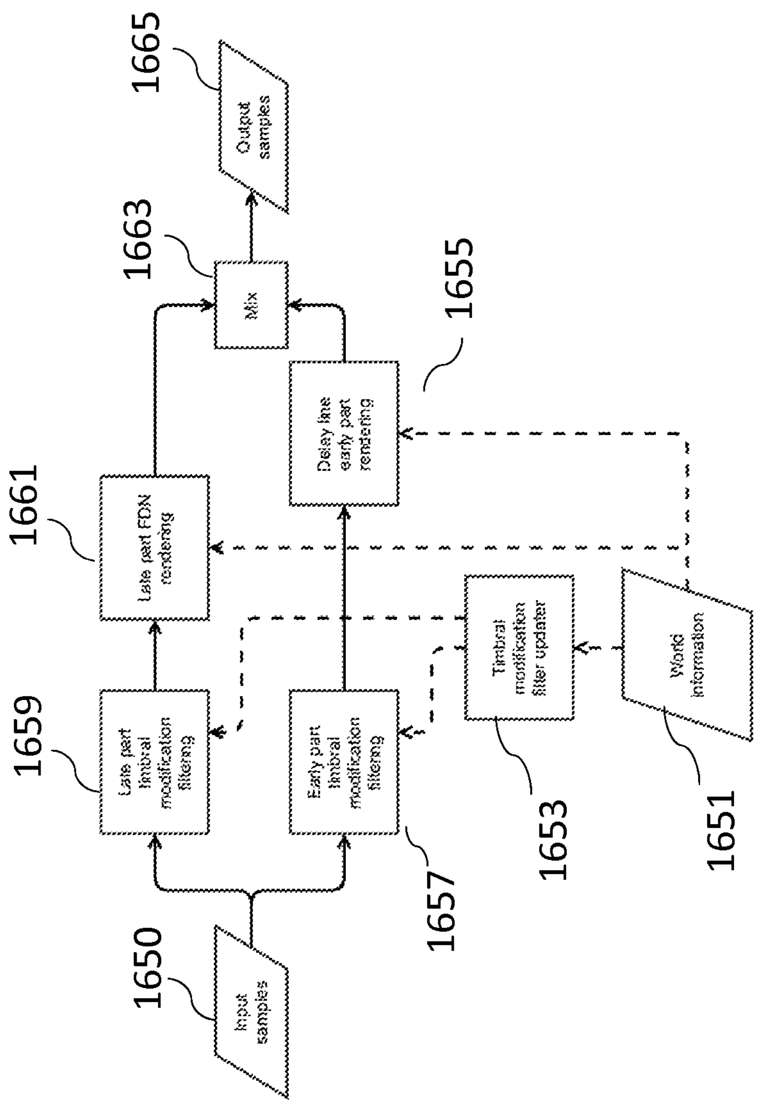
FIG. 16*d* shows a further example 6-DoF Renderer apparatus with timbral modification according to some embodiments.

Thus for example as shown in FIG. 16*d* the input samples 1650 are separated into late and early parts which are filtered by the late part timbral modification filter 1659 and early part timbral modification filter 1657. The late part timbral modification filter 1659 and early part timbral modification filter 1657 being defined based on the timbral modification filter updater 1653. The timbral modification filter updater 1653 controlled by the world information input 1651.

The timbral modification method is simple to add to this rendering system. First, the impulse response of the early part and the late part of the rendering systems is obtained. For the late part, the impulse response of the FDN can be simply measured by entering an impulse to the system and storing the output until output energy has dropped close to zero. Early part is usually obtained directly from the simulation but can be measured with the same impulse response measurement method. These impulse responses are the source impulse responses.

The outputs of the late part timbral modification filter 1659 and early part timbral modification filter 1657 can then be passed to the late part feedback delay network (FDN) renderer 1661 and the delay line early part renderer 1655 respectively. The late part FDN renderer 1661 and the delay line early part renderer 1655 can be controlled based on the world information input 1651. The outputs from the late part FDN renderer 1661 and the delay line early part renderer 1655 can then passed to a mixer 1663.

The mixer 1663 is configured to output the early and late part renders and then these can be output by the output 1665.

In this example, the early part is rendered with a delay line. A delay line as indicated above is a practical method of rendering individual reflections. In practice, each input sample is entered to the delay line and the defined early response controls the "taps" of the delay line. These delay line taps are separate outputs with a specific delay compared to the input. Each of these outputs can then have additional gains and filters to add effects. Thus, each tap is effectively a reflection (or their superposition) or the direct signal (usually the first tap) in the response.

With source responses known, it is possible to simply follow the timbral modification procedure and design the timbral modification filter. However, in some embodiments the filters are not applied to the impulse responses. Instead, the filters are applied directly to the input samples of early and late parts (separate filters for both). These filters can be, for example, minimum phase filters.

In some embodiments a real-time system, the update of the filters can be implemented based on any suitable scheme such as when a rendered source or the listener moves. Other updating mechanisms may be chosen as late reverberation is usually not position-dependent, only room-dependent. Thus, the filters for late reverberation can be pre-formed and an indication changed only when the room changes. For example in some embodiments the late reverberation part generation can be implemented standalone from the individual reflection and direct audio delay line parts.

In the MPEG-I implementation, diffuse late reverberation can be kept constant within an acoustic environment. A space with multiple rooms can have several acoustic environments. In some embodiments the early part changes can be based on the position but updating the rendering can be done gradually and more rarely (e.g., every 50 ms). To keep the source position accurate, the direct path may be updated more often. However, this may generate minor timbre changes.

The timbral modification filter is described above as zero-phase or minimum-phase FIR-filter. However, similar "colouration" of magnitude response can be done, for example, with equalization filter banks. This approach is especially beneficial for real-time use. In particular, for the late part of the response where the phase response is not critical, such an equalization filter bank can be appropriate. In an embodiment, the timbral modification filter is combined to the attenuation filters gi, i=1, . . . , D, of the FDN reverberator of FIG. 18*c*. This can be done, for example, by obtaining the desired magnitude response for the attenuation filters so that the desired, frequency dependent RT60 can be realized, and then obtaining the desired magnitude response of the timbral modification filter, and then designing new attenuation filters which have as their magnitude response the sum of these two magnitude responses. In this embodiment, applying the late part timbral modification filter comes with minimal additional cost assuming the structure of the attenuation filter can be kept the same as when no timbral modification filter is used.

The timbral modification filter for the delay-line use case may also be applied directly to the gains of the delay-line taps. In this case, a separate broadband gain value is obtained for each delay-tap such that the impulse response of the delay-line would be as close as possible to the timbrally modified simulated impulse response.

It is possible to use non-time-preserving timbral modification for the late part of reverberation as the late reverberation is dense enough that the time moment of individual reflections do not contribute as much to the perception.

Although the process is described specifically for using real target response and simulated source response, the method is in no way limited to this specific combination. It is possible to use, e.g., a very complex (non-realtime) simulation to create high-quality simulated target response and then use a computationally simple source response with it. For example, an encoder device can run acoustic simulations of the virtual space for a VR scene with very high order image source simulation, wave based acoustic simulation methods, or a combination of these to produce high quality simulated impulse responses for different locations in the scene. These can then be included in the bitstream along with the description of the virtual audio scene. In the renderer, a lower order acoustic simulation with, for example, low order image sources and a digital reverberator is used to create a simulated impulse response, and using the proposed method the simulated impulse response is shaped to be closer to high quality simulated impulse response associated to this location of the virtual scene. Equally, it is possible to use real response pairs in similar way.

The presented method may also be implemented in AR reverberation rendering. In AR, it is beneficial if objects can be plausibly rendered into the space where the listener is. AR headsets (such as Microsoft Hololens) offer possibility to obtain room geometry information. This can be used to create a simulation source response that can be timbrally modified to be closer to a suitable target real room response or with a real room response measured from the space where the listener is. This solves the problem of having plausible room reverberation in AR use.

It is possible to limit the amount of timbral modification using a constant or frequency-dependent limit such that measurable reverberation parameters (e.g., reverberation time) do not change more than a specified tolerance. This tolerance can be user-provided, signaled in the bitstream, or obtained in any other form.

Although the examples in above embodiments imply that the timbral modification method would be in the same device as the renderer, it is also possible to do the process in a separate device if the necessary information is available. For example, timbral modification could be precomputed in an encoder device for multiple known possible positions and the corresponding modification filters would be sent in bitstream to the renderer in decoder. As another example, in the AR rendering scenario the AR rendering device can perform scanning of the environment to obtain geometry information which is then uploaded to a server computer such as a 5G telecommunication network edge server. The 5G edge server can then perform acoustic simulation to obtain a high quality target response for the room. The high quality target response of the room can then be sent to the AR rendering device where the rendering device designs the timbral modification filter to modify the real-time rendered source impulse response closer to the high quality simulation based target response. As another example, the 5G edge server can create both the high quality acoustic simulation target response, and then simulate simplified source responses as the rendering client would do. For example, the high quality acoustic simulation can be based on high quality environment modeling data received from the rendering client and the simplified source responses can be created based on an emulation of such simplified room modeling which is performed on the AR rendering device. In other words, the 5G edge server performs both high quality acoustic modeling and simulates the modeling done by the AR rendering device in the space. Then, the 5G edge server can already design the timbral modification filters to be applied on the source responses so that they will be closer to the target. These timbral modification filters are then signaled to the client renderer which takes them into account and modifies the source responses it is creating in real time to be closer to the high quality source responses.

It should be noted that the reference room impulse responses are generally not modified during the process and thus the database can be stored already in the format where reference responses have been transformed to suitable frequency domain to save computations. Additionally, the timbral modification filter can also be implemented in separate parts (source part and target part) where the contribution of the reference response stays the same.

The embodiments have the benefit that they can approximate the sound of a real measured impulse response and provide perceptually good results suitable for real time rendering in resource constrained environments.

Figure 19:
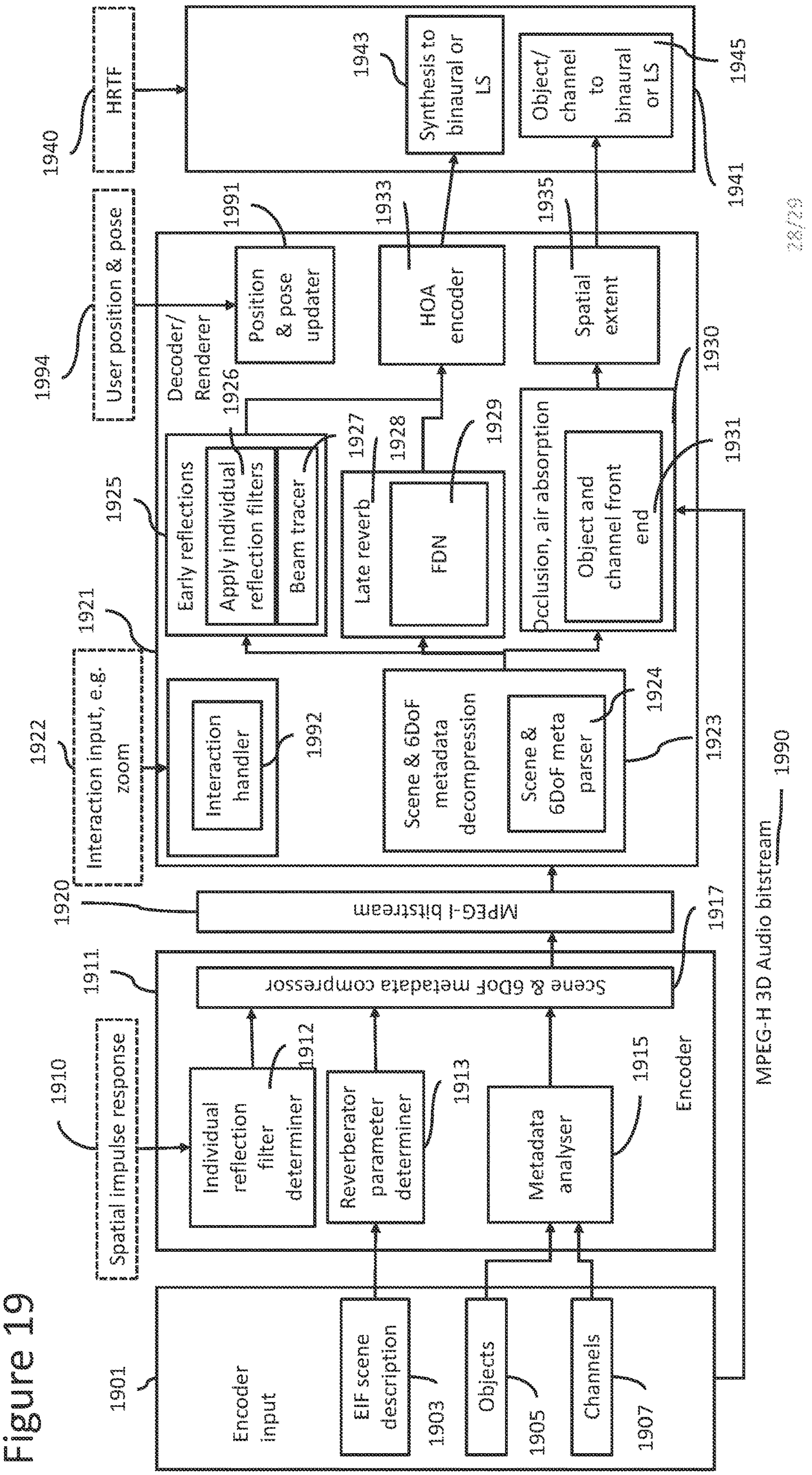
FIG. 19 shows an implementation of the system according to some embodiments.

FIG. 19 shows an example system which can utilize some embodiments as described herein. The system comprises an encoder device 1911 which creates a bitstream 1920 which is stored or streamed or otherwise transferred to a rendering device 1921. The devices running the encoder and renderer can be different devices, such as a workstation executing the encoder, with bitstream provided to the cloud, and an end user device running the renderer. Or all the elements of the encoder/bitstream/renderer chain can also be executed on a single device such as a personal computer.

FIG. 19 shows an encoder input 1901 which may in some embodiments comprise an EIF scene description 1903, audio object information 1905, and audio channel information 1907.

The encoder 1911 receives a description of the virtual audio scene 1901 to be encoded, along with description of the scene description 1903 indicating such parameters as geometry and materials. It also receives the audio object information 1905 or audio channel information 1907 to be encoded. In some embodiments the encoder 1911 comprises the individual reflection filter determiner 1912 configured to extract individual reflection filters. The encoder 1911 interfaces with a database 1910 of spatial impulse responses, from which individual reflection filters are extracted. This individual reflection filter extraction can happen either as an offline process before actual content encoding or then during content encoding in response to a content creator providing an example spatial impulse response.

Additionally the encoder 1911 may comprise a reverberator parameter determiner 1913 configured to generate reverberation parameters from the EIF (Encoder input format) scene description 1903 which can be passed to a compressor 1917.

Furthermore the encoder 1911 may comprise a metadata analyser 1915 configured to receive the outputs of the audio object information 1905, and audio channel information 1907 and analyse these to generate suitable metadata which can be passed to a compressor 1917.

A suitable scene and 6DoF metadata compressor 1917 can be configured to receive the individual reflection filters, reverberation parameters and metadata and generate a suitable MPEG-I bitstream 1920.

The individual reflection filters obtained as the result of the individual reflection filter extraction process are therefore included in the audio bitstream 1920 to be communicated to the renderer 1921. The encoder includes the necessary individual reflection filters based on materials found in the encoder input format (EIF) scene description for the scene geometry.

The encoder can further compress the metadata obtained this way. The compressed metadata is carried in MPEG-I bitstream. Audio signals furthermore in some embodiments can be carried in a MPEG-H 3D audio bitstream 1990. These bitstreams 1990, 1920 can be multiplexed or they can be separate bitstreams.

The decoder/renderer 1921 receives the audio bitstream comprising the audio channels and objects from the MPEG-H 3D audio bitstream 1920 and the encoded metadata from the MPEG-I metadata bitstream 1990.

The MPEG-I datastream 1920 can in some embodiments be handled by a scene and 6DoF metadata decompressor 1923 (which in some embodiments comprises a scene and 6DoF metadata parser 1924) configured to obtain the individual filter information, reverberation parameters and metadata.

The renderer can further receive user position and orientation (jointly referred to as pose) 1994 in a virtual space using external tracking devices such as a VR head mounted device (HMD).

Additionally the decoder/renderer 1921 comprises a position and pose updater 1991 configured to determine when a sufficient change in the position/pose has occurred.

The decoder/renderer 1921 may further comprise an interaction handler 1992 configured to handle any interaction input 1922 such as a zoom interaction.

Based on the user position and orientation in the virtual space, the renderer produces the audio signal. For a dry object or channel source, the renderer synthesizes the sound as a combination of the direct sound, discrete early reflections and diffuse late reverberation.

Thus for example the decoder/renderer 1921 comprises an early reflections processor 1925 comprising an individual reflection filter processor 1926 and beam tracer 1927. The invention is applied in the early reflection synthesis by substituting synthetic material filters or absorption coefficients with the measured individual reflection filters obtained in the audio bitstream.

The decoder/renderer 1921 further comprises late reverb processor 1928 configured to apply a FDN 1929.

Additionally the decoder/renderer 1921 comprises a occlusion, air absorption (direct) part processor 1930 configured to apply object and channel direct processing in an object/channel front end 1931.

The decoder/renderer 1921 may furthermore comprise a HOA encoder 1933 for generating suitable HOA signals to be passed to an output renderer 1941.

The decoder/renderer 1921 may furthermore comprise a spatial extent processor 1935 configured to output a spatial audio signal to the output renderer 1941.

An output renderer 1941 can for example receive head related transfer functions (associated with a headset/headphones etc) 1940 and comprise a synthesizer 1943 for generating binaural/loudspeaker audio signals. In some examples the output renderer 1941 can comprise a object/channel to binaural or loudspeaker generator 1945 configured to generate binaural or loudspeaker audio signals from the object or channels.

Figure 20:
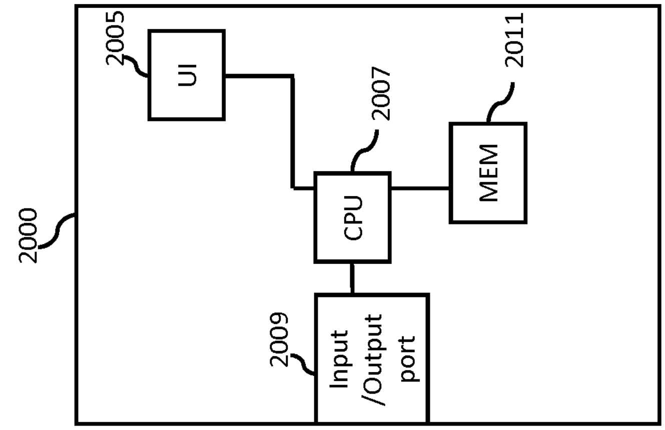
FIG. 20 shows an example device suitable for implementing the apparatus shown in previous figures.

With respect to FIG. 20 an example electronic device which may be used as any of the apparatus parts of the system as described above. The device may be any suitable electronics device or apparatus. For example in some embodiments the device 2000 is a mobile device, user equipment, tablet computer, computer, audio playback apparatus, etc. The device may for example be configured to implement the encoder or the renderer as shown in FIG. 1 or any functional block as described above.

In some embodiments the device 2000 comprises at least one processor or central processing unit 2007. The processor 2007 can be configured to execute various program codes such as the methods such as described herein.

In some embodiments the device 2000 comprises a memory 2011. In some embodiments the at least one processor 2007 is coupled to the memory 2011. The memory 2011 can be any suitable storage means. In some embodiments the memory 2011 comprises a program code section for storing program codes implementable upon the processor 2007. Furthermore in some embodiments the memory 2011 can further comprise a stored data section for storing data, for example data that has been processed or to be processed in accordance with the embodiments as described herein. The implemented program code stored within the program code section and the data stored within the stored data section can be retrieved by the processor 2007 whenever needed via the memory-processor coupling.

In some embodiments the device 2000 comprises a user interface 2005. The user interface 2005 can be coupled in some embodiments to the processor 2007. In some embodiments the processor 2007 can control the operation of the user interface 2005 and receive inputs from the user interface 2005. In some embodiments the user interface 2005 can enable a user to input commands to the device 2000, for example via a keypad. In some embodiments the user interface 2005 can enable the user to obtain information from the device 2000. For example the user interface 2005 may comprise a display configured to display information from the device 2000 to the user. The user interface 2005 can in some embodiments comprise a touch screen or touch interface capable of both enabling information to be entered to the device 2000 and further displaying information to the user of the device 2000. In some embodiments the user interface 2005 may be the user interface for communicating.

In some embodiments the device 2000 comprises an input/output port 2009. The input/output port 2009 in some embodiments comprises a transceiver. The transceiver in such embodiments can be coupled to the processor 2007 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The input/output port 2009 may be configured to receive the signals.

In some embodiments the device 2000 may be employed as at least part of the renderer. The input/output port 2009 may be coupled to headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus for a six degrees-of-freedom rendering comprising:

at least one processor; and at least one memory storing instructions that, when executed with the at least one processor, cause the apparatus at least to:

obtain at least one spatial room impulse response;

obtain at least one reflection filter based on the obtained at least one spatial room impulse response, wherein the at least one reflection filter is configured to determine, from the at least one spatial room impulse response, at least one early reflection from an acoustic surface which is not overlapped in time by another reflection, wherein a duration of the at least one early reflection is shorter than a duration of the obtained at least one spatial room impulse response;

associate the at least one reflection filter with a parameter associated with the at least one early reflection, wherein the parameter associated with the at least one early reflection comprises at least one of: a material, a material specification, or a material geometry from which the at least one early reflection occurred; and provide coefficients of the at least one reflection filter and the associated parameter to a renderer for use in the six degrees-of-freedom rendering.

2. The apparatus as claimed in claim 1, wherein the at least one spatial room impulse response comprises at least one individual reflection.

3. The apparatus as claimed in claim 2, wherein obtaining the at least one reflection filter comprises the instructions, when executed with the at least one processor, cause the apparatus to:

determine direction of arrival information based on an analysis of the at least one spatial room impulse response;

determine a sound pressure level information based on the at least one spatial room impulse response; and determine the at least one early reflection based on the direction of arrival information and the sound pressure level information.

4. The apparatus as claimed in claim 3, wherein determining the at least one early reflection comprises the instructions, when executed with the at least one processor, cause the apparatus to:

determine a time period associated with the determined at least one early reflection.

5. The apparatus as claimed in claim 4, wherein obtaining the at least one reflection filter based on the obtained at least one spatial room impulse response comprises the instructions, when executed with the at least one processor, cause the apparatus to:

extract a portion of the at least one spatial room impulse response defined by the time period associated with the determined at least one early reflection.

6. The apparatus as claimed in claim 1, wherein the parameter associated with the at least one early reflection is enabled based on at least one of:

at least one user input configured to select or define the parameter;

virtual acoustic scene geometry and acoustic description of the material in the virtual acoustic scene geometry; or at least one visual recognition of the parameter when the parameter comprises the material, in order to associate at least one individual reflection filter with the material.

7. The apparatus as claimed in claim 6, wherein obtaining the at least one reflection filter based on the obtained at least one spatial room impulse response comprises the instructions, when executed with the at least one processor, cause the apparatus to:

obtain octave-band absorption coefficients of a visually recognized material;

compare an octave-band magnitude spectrum of the at least one reflection filter to the octave-band absorption coefficients of the visually recognized material; and select the at least one reflection filter which has the octave-band magnitude spectrum closest to the octave-band absorption coefficients of the visually recognized material.

8. The apparatus as claimed in claim 1, wherein the instructions, when executed with the at least one processor, cause the apparatus to at least one of:

generate a database of the at least one reflection filter; or store the database of the at least one reflection filter with the parameter associated with the at least one early reflection.

9. An apparatus for a six degrees-of-freedom rendering comprising:

at least one processor; and at least one memory storing instructions that, when executed with the at least one processor, cause the apparatus at least to:

obtain at least one audio signal;

obtain at least one metadata associated with the at least one audio signal;

obtain at least one parameter associated with room acoustics and comprises at least one of: a material geometry; a dimension; a material; or a material specification;

obtain at least one reflection filter in accordance with the at least one parameter, wherein the at least one reflection filter is configured to determine at least one early reflection from at least one spatial room impulse response, which is not overlapped in time by another reflection, wherein a duration of the at least one early reflection is shorter than a duration of the at least one spatial room impulse response; and synthesize, with a renderer for use in the six degrees-of-freedom rendering, an output audio signal based on the at least one audio signal, the at least one metadata, the at least one parameter and the at least one reflection filter.

10. The apparatus as claimed in claim 9, wherein obtaining the at least the one reflection filter comprises the instructions, when executed with the at least one processor, cause the apparatus to:

select the at least one reflection filter from a database of reflection filters based on the at least one parameter associated with room acoustics.

11. The apparatus as claimed in claim 9, wherein the at least one parameter associated with room acoustics is a material parameter.

12. The apparatus as claimed in claim 9, wherein the instructions, when executed with the at least one processor, cause the apparatus to one of:

obtain the at least one reflection filter for at least one material; or obtain a database of at least one reflection filter for at least one material, and obtain an indicator configured to identify the at least one reflection filter from the database.

13. A method for a six degrees-of-freedom rendering comprising:

obtaining at least one spatial room impulse response;

obtaining at least one reflection filter based on the obtained at least one spatial room impulse response, wherein the at least one reflection filter is configured to determine, from the at least one spatial room impulse response, at least one early reflection from an acoustic surface which is not overlapped in time by another reflection, wherein a duration of the at least one early reflection is shorter than a duration of the obtained at least one spatial room impulse response;

associating the at least one reflection filter with a parameter associated with the at least one early reflection, wherein the parameter associated with the at least one early reflection comprises at least one of: a material, a material specification, or a material geometry from which the at least one early reflection occurred; and providing coefficients of the at least one reflection filter and the associated parameter to a renderer for use in the six degrees-of-freedom rendering.

14. The method of claim 13, wherein the at least one spatial room impulse response comprising the comprises at least one individual reflection.

15. The method of claim 14, wherein the obtaining of the at least one reflection filter comprises:

determining direction of arrival information based on an analysis of the at least one spatial room impulse response;

determining a sound pressure level information based on the at least one spatial room impulse response; and determining the at least one early reflection based on the direction of arrival information and the sound pressure level information.

16. The method of claim 15, wherein the determining of the at least one early reflection comprises:

determining a time period associated with the determined at least one early reflection.

17. The method of claim 16, wherein the obtaining of the at least one reflection filter based on the obtained at least one spatial room impulse response comprises:

extracting a portion of the at least one spatial room impulse response defined by the time period associated with the determined at least one early reflection.

18. The method of claim 13, wherein the parameter associated with the at least one early reflection is enabled based on at least one of:

at least one user input configured to select or define the parameter;

virtual acoustic scene geometry and acoustic description of the material in the virtual acoustic scene geometry; or at least one visual recognition of the parameter when the parameter comprises the material, in order to associate at least one individual reflection filter with the material.

19. The method of claim 18, wherein the obtaining of the at least one reflection filter based on the obtained at least one spatial room impulse response comprises:

obtaining octave-band absorption coefficients of a visually recognized material;

comparing an octave-band magnitude spectrum of the at least one reflection filter to the octave-band absorption coefficients of the visually recognized material; and selecting the at least one reflection filter which has the octave-band magnitude spectrum closest to the octave-band absorption coefficients of the visually recognized material.

20. A non-transitory computer-readable medium comprising program instructions stored thereon for performing the method of claim 13.

* * * * *